United States Patent
Chandler

(10) Patent No.: US 9,671,797 B2
(45) Date of Patent: Jun. 6, 2017

(54) OPTIMIZATION OF GAS TURBINE COMBUSTION SYSTEMS LOW LOAD PERFORMANCE ON SIMPLE CYCLE AND HEAT RECOVERY STEAM GENERATOR APPLICATIONS

(71) Applicant: Gas Turbine Efficiency Sweden AB, Jarfalla (SE)

(72) Inventor: Christopher Chandler, Austin, TX (US)

(73) Assignee: Gas Turbine Efficiency Sweden AB (SE)

(*) Notice: Subject to any disclaimer, the term of this patent is extended or adjusted under 35 U.S.C. 154(b) by 1149 days.

(21) Appl. No.: 13/767,933

(22) Filed: Feb. 15, 2013

(65) Prior Publication Data

US 2013/0158731 A1  Jun. 20, 2013

Related U.S. Application Data

(63) Continuation-in-part of application No. 13/542,222, filed on Jul. 5, 2012, now Pat. No. 9,267,443, which
(Continued)

(51) Int. Cl.
*G05D 17/00* (2006.01)
*F02C 9/28* (2006.01)
(Continued)

(52) U.S. Cl.
CPC .............. *G05D 17/00* (2013.01); *F02C 9/28* (2013.01); *F23N 1/002* (2013.01); *F23N 5/003* (2013.01);
(Continued)

(58) Field of Classification Search
CPC ...................................................... G05D 17/00
See application file for complete search history.

(56) References Cited

U.S. PATENT DOCUMENTS 3,842,597 A  10/1974  Ehrich
3,866,109 A  2/1975  Reed et al.
(Continued)

FOREIGN PATENT DOCUMENTS

CN  1148152  4/1997
CN  1611839  5/2005
(Continued)

OTHER PUBLICATIONS

Yukimoto et al, "A new PID controller tuning system and its application to a flue gas temperature control in a gas turbine power plant," Control Applications [Online] 1998, 2, pp. 1373-1377.
(Continued)

*Primary Examiner* — Tejal Gami
(74) *Attorney, Agent, or Firm* — DLA Piper LLP (US)

(57) ABSTRACT

Provided herein is a system and method for tuning the operation of a turbine and optimizing the mechanical life of a heat recovery steam generator. Provided therewith is a turbine controller, sensor means for sensing operational parameters, control means for adjusting operational control elements. The controller is adapted to tune the operation of the gas turbine in accordance preprogrammed steps in response to operational priorities selected by a user. The operational priorities preferably comprise optimal heat recovery steam generator life.

17 Claims, 16 Drawing Sheets

Related U.S. Application Data is a continuation-in-part of application No. 12/463,060, filed on May 8, 2009, now Pat. No. 8,437,941.

(60) Provisional application No. 61/601,876, filed on Feb. 22, 2012.

(51) Int. Cl.
| | | |
|---|---|---|
| F23N 1/00 | (2006.01) | |
| F23N 5/00 | (2006.01) | |
| F23N 5/24 | (2006.01) | |
| F23R 3/34 | (2006.01) | |

(52) U.S. Cl.
CPC .............. *F23N 5/242* (2013.01); *F23R 3/34* (2013.01); *F05D 2260/80* (2013.01); *F05D 2270/082* (2013.01); *F05D 2270/083* (2013.01); *F05D 2270/303* (2013.01); *F05D 2270/31* (2013.01); *F23N 2041/20* (2013.01); *F23R 2900/00013* (2013.01)

(56) References Cited

U.S. PATENT DOCUMENTS

| | | |
|---|---|---|
| 3,875,380 A | 4/1975 | Rankin |
| 3,898,439 A | 8/1975 | Reed et al. |
| 3,919,623 A | 11/1975 | Reuther |
| 3,924,140 A | 12/1975 | Yannone |
| 4,010,605 A | 3/1977 | Uram |
| 4,027,145 A | 5/1977 | McDonald et al. |
| 4,028,884 A | 6/1977 | Martz et al. |
| 4,031,404 A | 6/1977 | Martz et al. |
| 4,039,804 A | 8/1977 | Reed et al. |
| 4,039,846 A | 8/1977 | Vance |
| 4,051,669 A | 10/1977 | Yannone et al. |
| 4,115,998 A | 9/1978 | Gilbert et al. |
| 4,195,231 A | 3/1980 | Reed et al. |
| 4,201,923 A | 5/1980 | Reed et al. |
| 4,208,591 A | 6/1980 | Yannone et al. |
| 4,278,064 A | 7/1981 | Regueiro |
| 4,280,060 A | 7/1981 | Kure-Jensen et al. |
| 4,283,634 A | 8/1981 | Yannone et al. |
| 4,305,129 A | 12/1981 | Yannone et al. |
| 4,308,463 A | 12/1981 | Giras et al. |
| 4,314,441 A | 2/1982 | Yannone et al. |
| 4,319,320 A | 3/1982 | Sato et al. |
| 4,333,310 A | 6/1982 | Uram |
| 4,414,540 A | 11/1983 | Dickenson |
| 4,445,180 A | 4/1984 | Davis et al. |
| 4,455,614 A | 6/1984 | Martz et al. |
| 4,716,858 A | 1/1988 | Bartels |
| 4,735,052 A | 4/1988 | Maeda et al. |
| 4,761,948 A | 8/1988 | Sood et al. |
| 4,811,555 A | 3/1989 | Bell |
| 4,845,940 A | 7/1989 | Beer |
| 4,893,467 A | 1/1990 | Woodson |
| 4,930,305 A | 6/1990 | Bell |
| 4,936,088 A | 6/1990 | Bell |
| 5,022,849 A | 6/1991 | Yoshii et al. |
| 5,024,055 A | 6/1991 | Kirikami et al. |
| 5,237,939 A | 8/1993 | Spokoyny et al. |
| 5,307,619 A | 5/1994 | McCarty et al. |
| 5,319,931 A | 6/1994 | Beebe et al. |
| 5,319,936 A | 6/1994 | Ikeda et al. |
| 5,339,635 A | 8/1994 | Iwai et al. |
| 5,349,812 A | 9/1994 | Taniguchi et al. |
| 5,365,732 A | 11/1994 | Correa |
| 5,367,470 A | 11/1994 | Lang |
| 5,423,175 A | 6/1995 | Beebe et al. |
| 5,450,724 A | 9/1995 | Kesseli et al. |
| 5,480,298 A | 1/1996 | Brown |
| 5,487,265 A | 1/1996 | Rajamani et al. |
| 5,490,377 A | 2/1996 | Janes |
| 5,491,970 A | 2/1996 | Davis, Jr. et al. |
| 5,517,424 A | 5/1996 | Marcelle et al. |
| 5,533,329 A | 7/1996 | Ohyama et al. |
| 5,551,228 A | 9/1996 | Mick et al. |
| 5,564,270 A | 10/1996 | Kesseli et al. |
| 5,609,655 A | 3/1997 | Kesseli et al. |
| 5,636,507 A | 6/1997 | Rajamani et al. |
| 5,661,969 A | 9/1997 | Beebe et al. |
| 5,706,643 A | 1/1998 | Snyder et al. |
| 5,719,791 A | 2/1998 | Neumeier et al. |
| 5,722,230 A | 3/1998 | Cohen et al. |
| 5,729,968 A | 3/1998 | Cohen et al. |
| 5,784,300 A | 7/1998 | Neumeier et al. |
| 5,790,420 A | 8/1998 | Lang |
| 5,791,889 A | 8/1998 | Gemmen et al. |
| 5,794,446 A | 8/1998 | Earley et al. |
| 5,826,429 A | 10/1998 | Beebe et al. |
| 5,845,230 A | 12/1998 | Lamberson |
| 5,847,353 A | 12/1998 | Titus et al. |
| 5,867,977 A | 2/1999 | Zachary et al. |
| 5,878,566 A | 3/1999 | Endo et al. |
| 5,896,736 A | 4/1999 | Rajamani |
| 5,924,275 A | 7/1999 | Cohen et al. |
| 5,930,990 A | 8/1999 | Zachary et al. |
| 5,943,866 A | 8/1999 | Lovett et al. |
| 6,055,808 A | 5/2000 | Poola et al. |
| 6,066,825 A | 5/2000 | Titus et al. |
| 6,071,114 A | 6/2000 | Cusack et al. |
| 6,082,092 A | 7/2000 | Vandervort |
| 6,092,362 A | 7/2000 | Nagafuchi et al. |
| 6,125,625 A | 10/2000 | Lipinski et al. |
| 6,138,081 A | 10/2000 | Olejack et al. |
| 6,145,297 A | 11/2000 | Nagafuchi et al. |
| 6,164,055 A | 12/2000 | Lovett et al. |
| 6,195,607 B1 | 2/2001 | Rajamani et al. |
| 6,196,000 B1 | 3/2001 | Fassbender |
| 6,202,401 B1 | 3/2001 | Seume et al. |
| 6,205,765 B1 | 3/2001 | Iasillo et al. |
| 6,250,063 B1 | 6/2001 | Davis, Jr. et al. |
| 6,269,299 B1 | 7/2001 | Blotenberg |
| 6,287,111 B1 | 9/2001 | Gensler |
| 6,293,105 B1 | 9/2001 | Claesson et al. |
| 6,298,718 B1 | 10/2001 | Wang |
| 6,324,827 B1 | 12/2001 | Basu et al. |
| 6,338,240 B1 | 1/2002 | Endo et al. |
| 6,341,519 B1 | 1/2002 | Khesin et al. |
| 6,343,251 B1 | 1/2002 | Herron et al. |
| 6,354,071 B2 | 3/2002 | Tegel et al. |
| 6,363,330 B1 | 3/2002 | Alag et al. |
| 6,389,330 B1 | 5/2002 | Khesin |
| 6,397,602 B2 | 6/2002 | Vandervort et al. |
| 6,405,523 B1 | 6/2002 | Foust et al. |
| 6,408,611 B1 | 6/2002 | Keller et al. |
| 6,412,271 B1 | 7/2002 | Maker et al. |
| 6,418,726 B1 | 7/2002 | Foust et al. |
| 6,460,339 B2 | 10/2002 | Nishida et al. |
| 6,460,341 B1 | 10/2002 | Gutmark et al. |
| 6,461,144 B1 | 10/2002 | Gutmark et al. |
| 6,464,489 B1 | 10/2002 | Gutmark et al. |
| 6,466,859 B1 | 10/2002 | Fujime |
| 6,480,810 B1 | 11/2002 | Cardella et al. |
| 6,484,489 B1 | 11/2002 | Foust et al. |
| 6,522,991 B2 | 2/2003 | Banaszuk et al. |
| 6,522,994 B1 | 2/2003 | Lang |
| 6,529,849 B2 | 3/2003 | Umezawa et al. |
| 6,556,956 B1 | 4/2003 | Hunt |
| 6,560,563 B1 | 5/2003 | Lang |
| 6,568,166 B2 | 5/2003 | Jay et al. |
| 6,584,429 B1 | 6/2003 | Lang |
| 6,598,383 B1 | 7/2003 | Vandervort et al. |
| 6,612,112 B2 | 9/2003 | Gilbreth et al. |
| 6,616,901 B1 | 9/2003 | Lagana et al. |
| 6,640,544 B2 | 11/2003 | Suenaga et al. |
| 6,651,035 B1 | 11/2003 | Lang |
| 6,657,332 B2 | 12/2003 | Balas |
| 6,672,071 B2 | 1/2004 | Woltmann |
| 6,691,054 B1 | 2/2004 | Lang |
| 6,694,900 B2 | 2/2004 | Lissianski et al. |
| 6,704,620 B1 | 3/2004 | Kutzner et al. |
| 6,714,877 B1 | 3/2004 | Lang |
| 6,721,631 B2 | 4/2004 | Shimizu et al. |

(56) References Cited

U.S. PATENT DOCUMENTS

| | | |
|---|---|---|
| 6,721,649 B2 | 4/2004 | Knott et al. |
| 6,722,135 B2 | 4/2004 | Davis, Jr. et al. |
| 6,725,665 B2 | 4/2004 | Tuschy et al. |
| 6,742,341 B2 | 6/2004 | Ryan et al. |
| 6,745,152 B1 | 6/2004 | Lang |
| 6,757,619 B2 | 6/2004 | Zison et al. |
| 6,760,659 B1 | 7/2004 | Cowen |
| 6,760,689 B2 | 7/2004 | Follin et al. |
| 6,766,224 B2 | 7/2004 | Tanaka |
| 6,772,583 B2 | 8/2004 | Bland |
| 6,789,000 B1 | 9/2004 | Munson, Jr. |
| 6,799,146 B1 | 9/2004 | Lang |
| 6,810,358 B1 | 10/2004 | Lang et al. |
| 6,810,655 B2 | 11/2004 | Davis, Jr. et al. |
| 6,834,226 B2 | 12/2004 | Hartzheim |
| 6,839,613 B2 | 1/2005 | McCarthy et al. |
| 6,840,046 B2 | 1/2005 | Paschereit et al. |
| 6,845,300 B2 | 1/2005 | Haghgooie et al. |
| 6,862,889 B2 | 3/2005 | Held et al. |
| 6,865,889 B2 | 3/2005 | Mancini et al. |
| 6,868,368 B1 | 3/2005 | Lang |
| 6,871,501 B2 | 3/2005 | Bibler et al. |
| 6,873,933 B1 | 3/2005 | Lang |
| 6,877,307 B2 | 4/2005 | Ryan et al. |
| 6,880,325 B2 | 4/2005 | Aoyama |
| 6,883,301 B2 | 4/2005 | Woltmann |
| 6,898,488 B2 | 5/2005 | Kusaka et al. |
| 6,910,335 B2 | 6/2005 | Viteri et al. |
| 6,912,855 B2 | 7/2005 | Bescherer et al. |
| 6,912,856 B2 | 7/2005 | Morgan et al. |
| 6,912,889 B2 | 7/2005 | Staphanos et al. |
| 6,918,253 B2 | 7/2005 | Fassbender |
| 6,920,761 B2 | 7/2005 | Laper |
| 6,931,853 B2 | 8/2005 | Dawson |
| 6,941,217 B1 | 9/2005 | Munson, Jr. |
| 6,952,639 B2 | 10/2005 | Kumar et al. |
| 6,952,642 B1 | 10/2005 | Cowen |
| 6,955,039 B2 | 10/2005 | Nomura et al. |
| 6,968,693 B2 | 11/2005 | Colibaba-Evulet et al. |
| 6,973,376 B2 | 12/2005 | Kusaka et al. |
| 6,973,790 B2 | 12/2005 | Suenaga et al. |
| 6,973,791 B2 | 12/2005 | Handelsman et al. |
| 6,976,351 B2 | 12/2005 | Catharine et al. |
| 6,986,254 B2 | 1/2006 | Stuttaford et al. |
| 6,989,693 B2 | 1/2006 | Kuo et al. |
| 6,990,432 B1 | 1/2006 | McCarthy et al. |
| 6,996,991 B2 | 2/2006 | Gadde et al. |
| 7,006,898 B2 | 2/2006 | Barbir et al. |
| 7,007,487 B2 | 3/2006 | Belokon et al. |
| 7,039,555 B2 | 5/2006 | Lang |
| 7,047,747 B2 | 5/2006 | Tanaka |
| 7,050,943 B2 | 5/2006 | Kauffman et al. |
| 7,059,135 B2 | 6/2006 | Held et al. |
| 7,062,389 B2 | 6/2006 | Johnson et al. |
| 7,065,471 B2 | 6/2006 | Gotoh et al. |
| 7,065,472 B2 | 6/2006 | Hayashi et al. |
| 7,089,746 B2 | 8/2006 | Lieuwen et al. |
| 7,100,357 B2 | 9/2006 | Morgan et al. |
| 7,107,773 B2 | 9/2006 | Little |
| 7,111,463 B2 | 9/2006 | Sprouse et al. |
| 7,127,329 B2 | 10/2006 | Kusaka et al. |
| 7,127,898 B2 | 10/2006 | Healy |
| 7,143,572 B2 | 12/2006 | Ooka et al. |
| 7,161,678 B2 | 1/2007 | Schultz |
| 7,162,875 B2 | 1/2007 | Fletcher et al. |
| 7,177,728 B2 | 2/2007 | Gardner |
| 7,181,320 B2 | 2/2007 | Whiffen et al. |
| 7,181,321 B2 | 2/2007 | Schlicker et al. |
| 7,181,916 B2 | 2/2007 | Ziminsky et al. |
| 7,185,494 B2 | 3/2007 | Ziminsky et al. |
| 7,188,019 B2 | 3/2007 | Nomura et al. |
| 7,188,465 B2 | 3/2007 | Kothnur et al. |
| 7,190,149 B2 | 3/2007 | Huff et al. |
| 7,204,133 B2 | 4/2007 | Benson et al. |
| 7,210,297 B2 | 5/2007 | Shah et al |
| 7,216,486 B2 | 5/2007 | Doebbeling et al. |
| 7,219,040 B2 | 5/2007 | Renou et al. |
| 7,234,305 B2 | 6/2007 | Nomura et al. |
| 7,237,385 B2 | 7/2007 | Carrea |
| 7,246,002 B2 | 7/2007 | Healy et al. |
| 7,246,024 B2 | 7/2007 | Muramatsu et al. |
| 7,249,462 B2 | 7/2007 | Aumont et al. |
| 7,260,466 B2 | 8/2007 | Fujii |
| 7,260,935 B2 | 8/2007 | Colibaba-Evulet et al. |
| 7,260,937 B2 | 8/2007 | Kothnur et al. |
| 7,269,939 B2 | 9/2007 | Kothnur et al. |
| 7,269,952 B2 | 9/2007 | Arar et al. |
| 7,269,953 B2 | 9/2007 | Gadde et al. |
| 7,275,025 B2 | 9/2007 | Chan et al. |
| 7,278,266 B2 | 10/2007 | Taware et al. |
| 7,284,378 B2 | 10/2007 | Amond, III et al. |
| 7,288,921 B2 | 10/2007 | Huff et al. |
| 7,299,279 B2 | 11/2007 | Sadaghiany |
| 7,302,334 B2 | 11/2007 | Hook et al. |
| 7,320,213 B2 | 1/2008 | Shah et al. |
| 7,334,413 B2 | 2/2008 | Myhre |
| 7,349,765 B2 | 3/2008 | Reaume et al. |
| 7,353,084 B2 | 4/2008 | Schaper et al. |
| 7,356,383 B2 | 4/2008 | Pechtl et al. |
| 7,368,827 B2 | 5/2008 | Kulkarni et al. |
| 7,369,932 B2 | 5/2008 | Kim et al. |
| 7,377,036 B2 | 5/2008 | Johnson et al. |
| 7,385,300 B2 | 6/2008 | Huff et al. |
| 7,389,151 B2 | 6/2008 | Badami et al. |
| 7,389,643 B2 | 6/2008 | Simons et al. |
| 7,406,820 B2 | 8/2008 | Critchley et al. |
| 7,409,855 B2 | 8/2008 | Flint |
| 7,415,779 B2 | 8/2008 | St. Louis et al. |
| 7,435,080 B2 | 10/2008 | Joklik et al. |
| 7,437,871 B2 | 10/2008 | Cook |
| 7,441,398 B2 | 10/2008 | Ziminsky et al. |
| 7,441,448 B2 | 10/2008 | Volponi |
| 7,451,601 B2 | 11/2008 | Taware et al. |
| 7,456,517 B2 | 11/2008 | Campbell et al. |
| 7,457,688 B2 | 11/2008 | Szepek et al. |
| 7,457,710 B2 | 11/2008 | Schuermans et al. |
| 7,461,509 B2 | 12/2008 | Mick et al. |
| 7,471,996 B2 | 12/2008 | Bartel |
| 7,474,080 B2 | 1/2009 | Huff et al. |
| 7,478,525 B2 | 1/2009 | Iya et al. |
| 7,481,100 B2 | 1/2009 | Ponziani et al. |
| 7,484,369 B2 | 2/2009 | Myhre |
| 7,486,864 B2 | 2/2009 | Diatzikis |
| 7,487,642 B2 | 2/2009 | Joshi et al. |
| 7,489,835 B1 | 2/2009 | Xia et al. |
| 7,490,596 B2 | 2/2009 | Yasui et al. |
| 7,493,207 B2 | 2/2009 | Yasui et al. |
| 7,493,752 B2 | 2/2009 | Horswill et al. |
| 7,503,177 B2 | 3/2009 | Bland et al. |
| 7,509,810 B2 | 3/2009 | Smith et al. |
| 7,512,476 B2 | 3/2009 | Rosi et al. |
| 7,513,099 B2 | 4/2009 | Nuding et al. |
| 7,530,216 B2 | 5/2009 | Tsuzuki et al. |
| 7,530,260 B2 | 5/2009 | Dooley |
| 7,534,033 B2 | 5/2009 | Prinz et al. |
| 7,536,992 B1 | 5/2009 | Wieshuber et al. |
| 7,546,741 B2 | 6/2009 | Sasao et al. |
| 7,562,532 B2 | 7/2009 | Diaz et al. |
| 7,565,238 B2 | 7/2009 | Nakagawa et al. |
| 7,565,792 B2 | 7/2009 | Tanaka et al. |
| 7,565,805 B2 | 7/2009 | Steber et al. |
| 7,568,349 B2 | 8/2009 | Hadley |
| 7,571,045 B2 | 8/2009 | Muramatsu et al. |
| 7,577,549 B2 | 8/2009 | Osborn et al. |
| 7,582,359 B2 | 9/2009 | Sabol et al. |
| 7,584,617 B2 | 9/2009 | Bland et al. |
| 7,591,135 B2 | 9/2009 | Stewart |
| 7,600,369 B2 | 10/2009 | Tanaka et al. |
| 7,610,745 B2 | 11/2009 | Fujii et al. |
| 7,610,746 B2 | 11/2009 | Fujii et al. |
| 7,617,686 B2 | 11/2009 | Lilley et al. |
| 7,617,687 B2 | 11/2009 | West et al. |
| 7,620,461 B2 | 11/2009 | Frederick et al. |
| 7,623,999 B2 | 11/2009 | Clayton |

(56) References Cited

U.S. PATENT DOCUMENTS

| | | |
|---|---|---|
| 7,628,062 B2 | 12/2009 | Healy et al. |
| 7,628,078 B2 | 12/2009 | Matsui et al. |
| 7,630,820 B2 | 12/2009 | Sims et al. |
| 7,632,059 B2 | 12/2009 | Tisenchek et al. |
| 7,640,725 B2 | 1/2010 | Bland et al. |
| 7,640,793 B2 | 1/2010 | McCall et al. |
| 7,644,574 B2 | 1/2010 | Feiz |
| 7,644,577 B2 | 1/2010 | Linna et al. |
| 7,647,778 B2 | 1/2010 | Zewde et al. |
| 7,650,050 B2 | 1/2010 | Haffner et al. |
| 7,665,670 B2 | 2/2010 | Ahmed |
| 7,677,075 B2 | 3/2010 | Nies |
| 7,681,440 B2 | 3/2010 | Thomassin et al. |
| 7,684,880 B2 | 3/2010 | Bach |
| 7,690,204 B2 | 4/2010 | Drnevich et al. |
| 7,692,324 B2 | 4/2010 | Malakhova et al. |
| 7,693,147 B2 | 4/2010 | Williams et al. |
| 7,693,643 B2 | 4/2010 | Kim et al. |
| 7,698,030 B2 | 4/2010 | Martin |
| 7,698,897 B2 | 4/2010 | Rowe et al. |
| 7,702,447 B2 | 4/2010 | Volponi |
| 7,703,288 B2 | 4/2010 | Rogers |
| 7,707,833 B1 | 5/2010 | Bland et al. |
| 7,712,313 B2 | 5/2010 | Kojovic et al. |
| 7,730,726 B2 | 6/2010 | Asti et al. |
| 7,751,943 B2 | 7/2010 | Bollhalder et al. |
| 7,756,626 B2 | 7/2010 | Fujii et al. |
| 7,757,491 B2 | 7/2010 | Hessler |
| 7,765,856 B2 | 8/2010 | Wilbraham |
| 7,769,507 B2 | 8/2010 | Volponi et al. |
| 7,775,052 B2 | 8/2010 | Cornwell et al. |
| 7,788,014 B2 | 8/2010 | Volponi |
| 7,797,113 B2 | 9/2010 | Yoshida et al. |
| 7,805,922 B2 | 10/2010 | Bland |
| 7,818,970 B2 | 10/2010 | Price et al. |
| 7,822,512 B2 | 10/2010 | Thatcher et al. |
| 7,822,576 B2 | 10/2010 | Flint et al. |
| 7,823,388 B2 | 11/2010 | Murakami |
| 7,826,954 B2 | 11/2010 | Muramatsu et al. |
| 7,832,210 B2 | 11/2010 | Fecamp et al. |
| 7,836,676 B2 | 11/2010 | Futa, Jr. et al. |
| 7,837,429 B2 | 11/2010 | Zhang et al. |
| 7,840,336 B2 | 11/2010 | Muramatsu et al. |
| 7,841,180 B2 | 11/2010 | Kraemer et al. |
| 7,841,317 B2 | 11/2010 | Williams et al. |
| 7,853,433 B2 | 12/2010 | He et al. |
| 7,853,441 B2 | 12/2010 | Volponi et al. |
| 7,861,578 B2 | 1/2011 | Adibhatla et al. |
| 7,871,237 B2 | 1/2011 | Bunce et al. |
| 7,878,004 B2 | 2/2011 | Davies et al. |
| 7,886,875 B2 | 2/2011 | Shevchencko et al. |
| 7,895,821 B2 | 3/2011 | Annigeri et al. |
| 7,908,072 B2 | 3/2011 | Tonno et al. |
| 7,927,095 B1 | 4/2011 | Chorpening et al. |
| 7,942,038 B2 | 5/2011 | Ziminsky et al. |
| 7,945,523 B2 | 5/2011 | Hofmann et al. |
| 7,950,216 B2 | 5/2011 | Dooley et al. |
| 7,957,845 B2 | 6/2011 | Chen |
| 7,966,100 B2 | 6/2011 | Beekhuis |
| 7,966,801 B2 | 6/2011 | Umeh et al. |
| 7,966,802 B2 | 6/2011 | Szepek et al. |
| 7,966,804 B2 | 6/2011 | Snow |
| 7,966,834 B2 | 6/2011 | Myhre |
| 7,966,995 B2 | 6/2011 | Futa, Jr. et al. |
| 7,970,570 B2 | 6/2011 | Lynch et al. |
| 7,975,533 B2 | 7/2011 | Andrie |
| 7,980,082 B2 | 7/2011 | Ziminsky et al. |
| 7,983,829 B2 | 7/2011 | Muramatsu et al. |
| 7,997,083 B2 | 8/2011 | Meadows et al. |
| 8,001,761 B2 | 8/2011 | Myers, Jr. et al. |
| 8,005,575 B2 | 8/2011 | Kirchhof |
| 8,014,929 B2 | 9/2011 | Page et al. |
| 8,015,791 B2 | 9/2011 | Finkbeiner |
| 8,015,792 B2 | 9/2011 | Raver |
| 8,018,590 B2 | 9/2011 | Davis, Jr. et al. |
| 8,024,934 B2 | 9/2011 | Abreu et al. |
| 8,024,964 B2 | 9/2011 | Healy et al. |
| 8,028,512 B2 | 10/2011 | Mendoza et al. |
| 8,033,117 B2 | 10/2011 | Ziminsky et al. |
| 8,037,688 B2 | 10/2011 | Hagen et al. |
| 8,042,340 B2 | 10/2011 | Ma et al. |
| 8,056,062 B2 | 11/2011 | Bowers et al. |
| 8,056,317 B2 | 11/2011 | Feiz |
| 8,061,118 B2 | 11/2011 | Kothnur et al. |
| 8,068,997 B2 | 11/2011 | Ling et al. |
| 8,099,181 B2 | 1/2012 | Sterzing et al. |
| 8,145,403 B2 | 3/2012 | Fuller et al. |
| 8,417,433 B2 | 4/2013 | Gauthier |
| 9,097,185 B2 | 8/2015 | Demougeot |
| 2002/0084702 A1 | 7/2002 | Balas |
| 2002/0099474 A1 | 7/2002 | Khesin |
| 2002/0107614 A1 | 8/2002 | Tanaka |
| 2002/0142257 A1 | 10/2002 | Eroglu et al. |
| 2002/0198629 A1 | 12/2002 | Ellis |
| 2003/0009401 A1 | 1/2003 | Ellis |
| 2003/0018394 A1 | 1/2003 | McCarthy et al. |
| 2003/0036820 A1 | 2/2003 | Yellepeddy et al. |
| 2003/0037550 A1 | 2/2003 | Fassbender |
| 2003/0056517 A1 | 3/2003 | Brushwood et al. |
| 2003/0093184 A1 | 5/2003 | Tanaka |
| 2003/0120444 A1 | 6/2003 | Zison et al. |
| 2003/0144787 A1 | 7/2003 | Davis, Jr. et al. |
| 2003/0211432 A1 | 11/2003 | Gutmark et al. |
| 2003/0233831 A1 | 12/2003 | Suenaga et al. |
| 2004/0011051 A1 | 1/2004 | Ryan et al. |
| 2004/0025512 A1 | 2/2004 | Davis, Jr. et al. |
| 2004/0088060 A1 | 5/2004 | Renou et al. |
| 2004/0102872 A1 | 5/2004 | Schick et al. |
| 2004/0103068 A1 | 5/2004 | Eker et al. |
| 2004/0128111 A1 | 7/2004 | Lang |
| 2004/0128266 A1 | 7/2004 | Yellepeddy et al. |
| 2004/0159142 A1 | 8/2004 | Knott et al. |
| 2004/0191914 A1 | 9/2004 | Widmer et al. |
| 2004/0194468 A1 | 10/2004 | Ryan et al. |
| 2004/0197239 A1 | 10/2004 | Mirkovic et al. |
| 2004/0249515 A1 | 12/2004 | Johnson et al. |
| 2004/0255595 A1 | 12/2004 | Morgan et al. |
| 2005/0011179 A1 | 1/2005 | Ooka et al. |
| 2005/0021710 A1 | 1/2005 | Johnson et al. |
| 2005/0022499 A1 | 2/2005 | Belokon et al. |
| 2005/0038570 A1 | 2/2005 | Grauer |
| 2005/0049775 A1 | 3/2005 | Mooney |
| 2005/0061004 A1 | 3/2005 | Colibaba-Evulet et al. |
| 2005/0107941 A1 | 5/2005 | Healy |
| 2005/0107942 A1 | 5/2005 | Nomura et al. |
| 2005/0114010 A1 | 5/2005 | Healy et al. |
| 2005/0143865 A1 | 6/2005 | Gardner |
| 2005/0144955 A1 | 7/2005 | Handelsman et al. |
| 2005/0159849 A9 | 7/2005 | Johnson et al. |
| 2005/0160717 A1 | 7/2005 | Sprouse et al. |
| 2005/0188745 A1 | 9/2005 | Staphanos et al. |
| 2005/0203670 A1 | 9/2005 | Kusaka et al. |
| 2005/0217276 A1 | 10/2005 | Colibaba-Evulet et al. |
| 2005/0223713 A1 | 10/2005 | Ziminsky et al. |
| 2005/0247064 A1 | 11/2005 | Lieuwen |
| 2005/0257514 A1 | 11/2005 | Morgan et al. |
| 2005/0267642 A1 | 12/2005 | Whiffen et al. |
| 2005/0268617 A1 | 12/2005 | Amond, III et al. |
| 2005/0274115 A1 | 12/2005 | Pearce |
| 2005/0276306 A1 | 12/2005 | Mick et al. |
| 2005/0278076 A1 | 12/2005 | Barbir et al. |
| 2006/0040225 A1 | 2/2006 | Garay et al. |
| 2006/0041368 A1 | 2/2006 | Williams et al. |
| 2006/0080965 A1 | 4/2006 | Healy |
| 2006/0106501 A1 | 5/2006 | Gomer et al. |
| 2006/0137353 A1 | 6/2006 | Lieuwen et al. |
| 2006/0149423 A1 | 7/2006 | Barnicki et al. |
| 2006/0178782 A1 | 8/2006 | Pechtl et al. |
| 2006/0190139 A1 | 8/2006 | Reaume et al. |
| 2006/0228596 A1 | 10/2006 | Campbell et al. |
| 2006/0230743 A1 | 10/2006 | Sprouse et al. |
| 2006/0254279 A1 | 11/2006 | Taware et al. |
| 2006/0260319 A1 | 11/2006 | Ziminsky et al. |
| 2006/0288706 A1 | 12/2006 | Ziminsky et al. |

(56) References Cited

U.S. PATENT DOCUMENTS

| | | |
|---|---|---|
| 2007/0021899 A1 | 1/2007 | Griffin et al. |
| 2007/0055392 A1 | 3/2007 | D'Amato et al. |
| 2007/0067068 A1 | 3/2007 | Havlena et al. |
| 2007/0074519 A1 | 4/2007 | Hadley |
| 2007/0084217 A1 | 4/2007 | Nicholls |
| 2007/0089425 A1 | 4/2007 | Motter et al. |
| 2007/0113560 A1 | 5/2007 | Steber et al. |
| 2007/0119147 A1 | 5/2007 | Cornwell et al. |
| 2007/0119178 A1 | 5/2007 | Berenbrink et al. |
| 2007/0125088 A1 | 6/2007 | Kothnur et al. |
| 2007/0141417 A1 | 6/2007 | Bitoh |
| 2007/0142975 A1 | 6/2007 | Piche |
| 2007/0151252 A1 | 7/2007 | Cornwell et al. |
| 2007/0151257 A1 | 7/2007 | Maier et al. |
| 2007/0157620 A1 | 7/2007 | Healy et al. |
| 2007/0157624 A1 | 7/2007 | Bland et al. |
| 2007/0162189 A1 | 7/2007 | Huff et al. |
| 2007/0163267 A1 | 7/2007 | Flohr et al. |
| 2007/0180831 A1 | 8/2007 | Bland |
| 2007/0186875 A1 | 8/2007 | Jonson |
| 2007/0198132 A1 | 8/2007 | Yamamoto et al. |
| 2007/0213878 A1 | 9/2007 | Chen |
| 2007/0214796 A1 | 9/2007 | Bland et al. |
| 2007/0214797 A1 | 9/2007 | Bland et al. |
| 2007/0214798 A1 | 9/2007 | Frevel |
| 2007/0220896 A1 | 9/2007 | Varatharajan et al. |
| 2007/0227148 A1 | 10/2007 | Bland et al. |
| 2007/0227155 A1 | 10/2007 | Nemet et al. |
| 2007/0240648 A1 | 10/2007 | Badami et al. |
| 2007/0245707 A1 | 10/2007 | Pashley |
| 2007/0255459 A1 | 11/2007 | Althaus |
| 2007/0267997 A1 | 11/2007 | Kanazawa et al. |
| 2007/0271024 A1 | 11/2007 | Fujii et al. |
| 2007/0271927 A1 | 11/2007 | Myers et al. |
| 2007/0298295 A1 | 12/2007 | Daly et al. |
| 2008/0000214 A1 | 1/2008 | Kothnur et al. |
| 2008/0004721 A1 | 1/2008 | Huff et al. |
| 2008/0016875 A1 | 1/2008 | Ryan et al. |
| 2008/0016876 A1 | 1/2008 | Colibaba-Evulet et al. |
| 2008/0034731 A1 | 2/2008 | Pashley |
| 2008/0047275 A1 | 2/2008 | Ziminsky et al. |
| 2008/0071427 A1 | 3/2008 | Szepek et al. |
| 2008/0083228 A1 | 4/2008 | Myhre |
| 2008/0098746 A1 | 5/2008 | Iasillo et al. |
| 2008/0118343 A1 | 5/2008 | Arthur et al. |
| 2008/0134684 A1 | 6/2008 | Umeh et al. |
| 2008/0141643 A1 | 6/2008 | Varatharajan et al. |
| 2008/0154474 A1 | 6/2008 | Iasillo et al. |
| 2008/0177456 A1 | 7/2008 | Hill et al. |
| 2008/0177505 A1 | 7/2008 | Volponi |
| 2008/0243352 A1 | 10/2008 | Healy |
| 2008/0245980 A1 | 10/2008 | Diatzikis |
| 2008/0260519 A1 | 10/2008 | Dooley |
| 2008/0264034 A1 | 10/2008 | Iya et al. |
| 2008/0270003 A1 | 10/2008 | Sims et al. |
| 2008/0281483 A1 | 11/2008 | Litt |
| 2008/0281562 A1 | 11/2008 | Chou et al. |
| 2008/0288120 A1 | 11/2008 | Lindenmuth et al. |
| 2008/0288928 A1 | 11/2008 | Bowers |
| 2008/0289314 A1 | 11/2008 | Snider et al. |
| 2008/0301499 A1 | 12/2008 | Grichnik |
| 2009/0005950 A1 | 1/2009 | Scalia, Jr. |
| 2009/0005951 A1 | 1/2009 | Frederick, II et al. |
| 2009/0005952 A1 | 1/2009 | Tonno et al. |
| 2009/0007564 A1 | 1/2009 | Suzuki et al. |
| 2009/0037036 A1 | 2/2009 | Nguyen et al. |
| 2009/0042151 A1 | 2/2009 | Joklik et al. |
| 2009/0043485 A1 | 2/2009 | Banks |
| 2009/0044513 A1 | 2/2009 | Fuller et al. |
| 2009/0046762 A1 | 2/2009 | Henshaw et al. |
| 2009/0055070 A1 | 2/2009 | De et al. |
| 2009/0055071 A1 | 2/2009 | Way et al. |
| 2009/0055130 A1 | 2/2009 | Pandey et al. |
| 2009/0055145 A1 | 2/2009 | Volponi et al. |
| 2009/0071118 A1 | 3/2009 | Ma et al. |
| 2009/0071442 A1 | 3/2009 | Emo et al. |
| 2009/0082919 A1 | 3/2009 | Hershey et al. |
| 2009/0105852 A1 | 4/2009 | Wintrich et al. |
| 2009/0112441 A1 | 4/2009 | Perschi et al. |
| 2009/0125207 A1 | 5/2009 | Nomura et al. |
| 2009/0126367 A1 | 5/2009 | Chhabra et al. |
| 2009/0132145 A1 | 5/2009 | Angeby |
| 2009/0138170 A1 | 5/2009 | Nemet et al. |
| 2009/0141349 A1 | 6/2009 | Myhre |
| 2009/0142717 A1 | 6/2009 | Lavelle |
| 2009/0150040 A1 | 6/2009 | Rofka |
| 2009/0182441 A1 | 7/2009 | Wintrich et al. |
| 2009/0183551 A1 | 7/2009 | Fattic et al. |
| 2009/0193788 A1 | 8/2009 | Szepek et al. |
| 2009/0222187 A1 | 9/2009 | Martling et al. |
| 2009/0223210 A1 | 9/2009 | Klejeski et al. |
| 2009/0223225 A1 | 9/2009 | Kraemer et al. |
| 2009/0226327 A1 | 9/2009 | Little et al. |
| 2009/0234554 A1 | 9/2009 | Buehman |
| 2009/0265049 A1 | 10/2009 | Wise et al. |
| 2009/0266150 A1 | 10/2009 | Novis |
| 2009/0271149 A1 | 10/2009 | Brown |
| 2009/0271340 A1 | 10/2009 | Schneegass et al. |
| 2009/0292437 A1 | 11/2009 | Cloft |
| 2009/0293597 A1 | 12/2009 | Andrie |
| 2009/0301097 A1 | 12/2009 | Deuker et al. |
| 2009/0313056 A1 | 12/2009 | Beekhuis |
| 2009/0320492 A1 | 12/2009 | Carin et al. |
| 2009/0326781 A1 | 12/2009 | Mukavetz et al. |
| 2009/0326782 A1 | 12/2009 | Nunn |
| 2009/0326784 A1 | 12/2009 | Tanner et al. |
| 2010/0011851 A1 | 1/2010 | Healy et al. |
| 2010/0018183 A1 | 1/2010 | Feiz |
| 2010/0024393 A1 | 2/2010 | Chi et al. |
| 2010/0024536 A1 | 2/2010 | Adibhatla et al. |
| 2010/0031633 A1 | 2/2010 | Kitazawa |
| 2010/0034635 A1 | 2/2010 | Erickson et al. |
| 2010/0042367 A1 | 2/2010 | Brown |
| 2010/0050591 A1 | 3/2010 | Nemet et al. |
| 2010/0070098 A1 | 3/2010 | Sterzing et al. |
| 2010/0077970 A1 | 4/2010 | Kumar et al. |
| 2010/0082267 A1 | 4/2010 | Schimert et al. |
| 2010/0106462 A1 | 4/2010 | Liu |
| 2010/0117859 A1 | 5/2010 | Mitchell et al. |
| 2010/0122535 A1 | 5/2010 | Finkbeiner |
| 2010/0162678 A1 | 7/2010 | Annigeri |
| 2010/0162724 A1 | 7/2010 | Myers et al. |
| 2010/0170219 A1 | 7/2010 | Venkataraman et al. |
| 2010/0170244 A1 | 7/2010 | Brooks et al. |
| 2010/0170261 A1 | 7/2010 | Stieger et al. |
| 2010/0172017 A1 | 7/2010 | Kim et al. |
| 2010/0198419 A1 | 8/2010 | Sonoda et al. |
| 2010/0199680 A1 | 8/2010 | Nomura et al. |
| 2010/0204931 A1 | 8/2010 | Ling et al. |
| 2010/0205976 A1 | 8/2010 | Nag et al. |
| 2010/0215480 A1 | 8/2010 | Leach et al. |
| 2010/0220182 A1 | 9/2010 | Krull et al. |
| 2010/0223933 A1 | 9/2010 | Umeh et al. |
| 2010/0229524 A1 | 9/2010 | Bhatnagar et al. |
| 2010/0241331 A1 | 9/2010 | Duke et al. |
| 2010/0242436 A1 | 9/2010 | Tangirala et al. |
| 2010/0242492 A1 | 9/2010 | Sloat et al. |
| 2010/0262263 A1 | 10/2010 | Karaffa et al. |
| 2010/0262265 A1 | 10/2010 | Karaffa |
| 2010/0262352 A1 | 10/2010 | Kuwahara et al. |
| 2010/0262401 A1 | 10/2010 | Pfeifer |
| 2010/0269515 A1 | 10/2010 | Kishi et al. |
| 2010/0275609 A1 | 11/2010 | Snider |
| 2010/0278639 A1 | 11/2010 | Hood et al. |
| 2010/0280730 A1 | 11/2010 | Page et al. |
| 2010/0280889 A1 | 11/2010 | Childers |
| 2010/0286890 A1 | 11/2010 | Chandler |
| 2010/0287943 A1 | 11/2010 | McMahan et al. |
| 2010/0287947 A1 | 11/2010 | Rogers et al. |
| 2010/0300108 A1 | 12/2010 | Demougeot et al. |
| 2010/0301615 A1 | 12/2010 | Yamashita et al. |
| 2010/0307157 A1 | 12/2010 | Bilton et al. |

(56) References Cited

U.S. PATENT DOCUMENTS

| | | |
|---|---|---|
| 2010/0307158 A1 | 12/2010 | Bilton et al. |
| 2010/0313572 A1 | 12/2010 | McManus et al. |
| 2010/0326080 A1 | 12/2010 | Rogers et al. |
| 2011/0004356 A1 | 1/2011 | Garcia |
| 2011/0004390 A1 | 1/2011 | Nomura et al. |
| 2011/0048022 A1 | 3/2011 | Singh et al. |
| 2011/0052370 A1 | 3/2011 | Karpman et al. |
| 2011/0054704 A1 | 3/2011 | Karpman et al. |
| 2011/0056181 A1 | 3/2011 | Dinu |
| 2011/0077783 A1 | 3/2011 | Karpman et al. |
| 2011/0079015 A1 | 4/2011 | Geis et al. |
| 2011/0079020 A1 | 4/2011 | Durocher et al. |
| 2011/0137536 A1 | 6/2011 | Tonno et al. |
| 2011/0138766 A1 | 6/2011 | ElKady et al. |
| 2011/0138813 A1 | 6/2011 | Sandvik et al. |
| 2011/0146232 A1 | 6/2011 | Westervelt et al. |
| 2011/0153295 A1 | 6/2011 | Yerramalla et al. |
| 2011/0154826 A1 | 6/2011 | Iwasaki et al. |
| 2011/0154828 A1 | 6/2011 | Iwasaki et al. |
| 2011/0156391 A1 | 6/2011 | Kirchner et al. |
| 2011/0160979 A1 | 6/2011 | Muller |
| 2011/0172893 A1 | 7/2011 | Nomura et al. |
| 2011/0179802 A1 | 7/2011 | Snider et al. |
| 2011/0191004 A1 | 8/2011 | Nomura et al. |
| 2011/0196593 A1 | 8/2011 | Jiang et al. |
| 2011/0197594 A1 | 8/2011 | Khosla et al. |
| 2011/0214644 A1 | 9/2011 | Barta et al. |
| 2011/0215775 A1 | 9/2011 | Engelhardt et al. |
| 2011/0224959 A1 | 9/2011 | Zhang et al. |
| 2011/0225976 A1 | 9/2011 | Ziminsky et al. |
| 2011/0239621 A1 | 10/2011 | Meneely et al. |
| 2011/0247314 A1 | 10/2011 | Chila et al. |
| 2011/0247406 A1 | 10/2011 | Grosse-Laxzen et al. |
| 2011/0262334 A1 | 10/2011 | Kraemer et al. |
| 2011/0265487 A1 | 11/2011 | Gauthier et al. |
| 2011/0270502 A1 | 11/2011 | Demougeot et al. |
| 2011/0270503 A1 | 11/2011 | Stuttaford et al. |
| 2011/0277482 A1 | 11/2011 | Mosley et al. |
| 2011/0277539 A1 | 11/2011 | Meerbeck et al. |
| 2011/0289932 A1 | 12/2011 | Thompson |
| 2011/0289934 A1 | 12/2011 | Desabhatla |

FOREIGN PATENT DOCUMENTS

| | | |
|---|---|---|
| CN | 101438367 | 5/2009 |
| EP | 0 306 064 | 3/1989 |
| EP | 1067338 A2 | 1/2001 |
| EP | 1199519 | 4/2002 |
| EP | 1348908 | 10/2003 |
| EP | 1788309 | 5/2007 |
| EP | 1808589 | 7/2007 |
| EP | 1909032 A2 | 4/2008 |
| EP | 2 014 898 | 1/2009 |
| EP | 2204561 A2 | 7/2010 |
| EP | 2249007 | 11/2010 |
| EP | 2333280 A2 | 6/2011 |
| GB | 2 272 783 | 5/1994 |
| JP | 61036809 | 2/1986 |
| JP | 08-042361 | 2/1996 |
| JP | 08-210635 A2 | 8/1996 |
| JP | 2006-144796 | 6/2006 |
| JP | 2007-138949 | 6/2007 |
| JP | 2009-296994 | 12/2009 |
| JP | 2010-103781 | 5/2010 |
| JP | 2010-159954 | 7/2010 |
| RU | 2 162 953 | 2/2001 |
| RU | 2 252 328 | 5/2005 |
| RU | 2 280 775 | 7/2006 |
| RU | 2 287 074 | 11/2006 |
| RU | 2 322 601 | 4/2008 |
| TW | 385352 | 3/2000 |
| TW | 200928079 | 7/2009 |

OTHER PUBLICATIONS

Doris Saez, Freddy Milla and Luis S. Vargas, "Fuzzy Predictive Supervisory Control Based on Genetic Algorithms for Gas Turbines of Combined Cycle Power Plants," IEEE Transactions of Energy Conversion, vol. 22, No. 3, Sep. 2007.
John Xia and Rick Antos, "SGT6-5000F (W501F) 3 Million Hours Fleet Operational Experience," Power-Gen International 2006—Orlando, FL, Nov. 2006.
Angello, L., "Tuning Approaches for DLN Combustor Performance and Reliability" Technical Update, Electric Power Research Institute (EPRI), Mar. 2005.
Jesse Sewell, Pete Sobieski, and Craig Beers, "Application of Continuous Combustion Dynamics Monitoring on Large Industrial Gas Turbines," ASME Conf. Proc. 2004, 807 (2004).
Bland, R., Ryan, W., Abou-Jaoude, K., Bandaru, R., Harris, A., Rising, B., "Siemens W501F Gas Turbine: Ultra Low NOx Combustion System Development," Siemens Westinghouse, 2004.
Sébastien Candel, "Combustion dynamics and control: Progress and challenges," Proceedings of the Combustion Institute, vol. 29, Issue 1, 2002, pp. 1-28.
Yoshi Usune, Masao Terazaki, Yasuoki Tomita, Jun-Hee Lee, "Technical Approach to Higher Availability of Gas Turbine Combined Cycle".
Andersen, Helmer, "Early Detection of Combustor Pulsations and Optimized Operation Through On-Line Monitoring Systems," International Gas Turbine and Aeroengine Congress and Exhibition, May 2000.
Corbett, N.C., "Remote Monitoring and Control of Advanced Gas Turbines," Computing & Control Engineering Journal, Apr. 2001.
Jeffrey D. Willis and A. John Moran, "Industrial RB211 DLE Gas Turbine Combustion Update," Proceedings of ASME Turboexpo, 2000.
Thomas Scarinci and John L. Halpin, "Industrial Trent Combustor—Combustion Noise Characteristics," International Gas Turbine & Aeroengine Congress & Exhibition, 1999.
Frank J. Brooks, "GE Gas Turbine Performance Characteristics," GE Power Systems, GER-3567H, Oct. 2000.
Communication dated Jun. 20, 2013 issued in corresponding European Application No. 10159823.3 with attached Search Report.
Int'l Search Report dated Jun. 20, 2013 issued in corresponding Int'l Application No. PCT/US2013/026291.
Int'l Search Report dated Jun. 20, 2013 issued in corresponding Int'l Application No. PCT/US2013/026295.
Search Report dated Apr. 20, 2014 issued in Corresponding Gulf Cooperation Council Application No. 2010/15815.
Office Action w/ English Translation dated Jun. 9, 2014 issued in Corresponding Mexican Application No. MX/a/2010/004869.
International Preliminary Report on Patentability and Written Opinion issued in Corresponding PCT Application No. PCT/US13/26291.
International Preliminary Report on Patentability and Written Opinion issued in Corresponding PCT Application No. PCT/US13/26295.
Examiner's Requisition from corresponding Canadian Application No. 2,817,609.
Office Action dated Jan. 15, 2015 from related U.S. Appl. No. 13/855,220.
Office Action along with Search Report and its English Translation dated May 30, 2015, received in related Taiwanese Application No. 102106081.
Office Action along with Search Report and its English Translation dated May 28, 2015, received in related Taiwanese Application No. 102106078.
Office Action dated Nov. 19, 2015 in corresponding Chinese Application No. 201310136070.5, along with its English Translation.
Notice of Allowance and Fees due dated Dec. 24, 2015, in related U.S. Appl. No. 13/855,220.
Examination Report dated Dec. 31, 2015 in corresponding Indian Application No. 1284/MUM/2010.
Office Action dated Feb. 27, 2013 issued in corresponding Chinese Application No. 201010177967.9 with attached Search Report.

OPTIMIZATION OF GAS TURBINE COMBUSTION SYSTEMS LOW LOAD PERFORMANCE ON SIMPLE CYCLE AND HEAT RECOVERY STEAM GENERATOR APPLICATIONS

CROSS-REFERENCE TO RELATED APPLICATIONS

This application is a continuation-in-part of U.S. application Ser. No. 13/542,222, filed on Jul. 5, 2012, which is a continuation-in-part of U.S. application Ser. No. 12/463,060 filed on May 8, 2009. This application also claims the benefit of U.S. Application Ser. No. 61/601,876, filed on Feb. 22, 2012. The contents of U.S. application Ser. Nos. 12/463,060, 13/542,222 and 61/601,876 are hereby incorporated by reference in their entirety.

TECHNICAL FIELD

The present disclosure relates to an automated system to sense the operating condition of a combustion system and to make preset adjustments to achieve desired operation of the turbine thru out an optimized load range.

BACKGROUND

Lean premixed combustion systems have been deployed on land based gas turbine engines to reduce emissions, such as NOx and CO. These systems have been successful and, in some cases, produce emission levels that are at the lower limits of measurement capabilities, approximately 1 to 3 parts per million (ppm) of NOx and CO. Although these systems are a great benefit from a standpoint of emission production, the operational envelope of the systems is substantially reduced when compared to more conventional combustion systems. As a consequence, the control of fuel conditions, distribution and injection into the combustion zones has become a critical operating parameter and requires frequent adjustment, when ambient atmospheric conditions, such as temperature, humidity and pressure, change. The re-adjustment of the combustion fuel conditions, distribution and injection is termed tuning.

Controlled operation of a combustion system generally employs a manual setting of the operational control elements of a combustor to yield an average operational condition. These settings may be input through a controller, which as used herein shall refer to any device used to control the operation of a system. Examples include a Distributed Control System (DCS), a fuel turbine controller, a programmable logical controller (PLC), a stand-alone computer with communication to another controller and/or directly to a system.

These settings are satisfactory at the time of the setup, but conditions may change and cause unacceptable operation in a matter of hours or days. Tuning issues are any situation whereby any operational parameters of a system are in excess of acceptable limits. Examples include emissions excursion outside of allowable limits, combustor dynamics excursion outside of allowable limits, or any other tuning event requiring adjustment of a turbine's operational control elements. Other approaches use a formula to predict emissions based on gas turbine's operating settings and select a set point for fuel distribution and/or overall machine fuel/air ratio, without modifying other control elements, such as fuel gas temperature. Still other approaches employ a remote connection to the site by tuning experts, that will periodically readjust the tune, from the remote location. These approaches do not allow for continuous timely variation, do not comprehensively take advantage of actual dynamics and emission data or do not modify fuel distribution, fuel temperature and/or other turbine control elements.

Another variable that impacts the lean premixed combustion system is fuel composition. Sufficient variation in fuel composition will cause a change in the heat release of the lean premixed combustion system. Such change may lead to emissions excursions, unstable combustion processes, or even blow out of the combustion system.

In recent years, over-capacity of power generation, even that using F-class firing temperature gas turbines, has resulted in much of the installed gas turbine fleet running in a cyclic mode versus baseload operation. This means that many gas turbine operators are forced to shut their equipment down overnight, when power prices are so low that the losses incurred running overnight far outweigh the costs of starting the equipment every morning. This operation process has an impact on the maintenance of the equipment as each stop/start cycle causes a resulting load cycle on the equipment.

To combat this situation, gas turbine operators are investigating ways of running their equipment overnight while incurring the smallest economic loss possible. One viable solution is to lower the minimum load a gas turbine can achieve while still maintaining acceptable emissions levels. This method of operation is commonly referred to as "Turndown."

"Turndown" has been used within the power generation industry for many years. As such, nothing directly related to this mode of operation is included as part of this patent. What is novel is the approach used by the ECOMAX™ tuning controller to tune the combustion system while in turndown, as well as the method incorporated within ECO-MAX™ to mitigate detrimental effects on the combined-cycle heat recovery steam generator (HRSG) caused by low steam flows and high gas turbine exhaust temperatures. The system is also applicable to simple cycle operation; however, most simple cycle systems are applied to peak power generation and have a desirable shut-down process in the operating plan.

Often, as gas turbine loads are reduced, HRSG steam flows reduce while gas turbine exhaust temperatures rise. This combination, in conjunction with inadequate intra-stage attemperation flow capacity, often results in excessively high HRSG outlet steam temperatures (steam turbine inlet steam temperatures). In many cases these steam temperatures approach material limitations and can lead to pre-mature component failure. On the other extreme, steam conditioning/attemperation systems with adequate condensate flows can provide enough condensate to keep the superheat outlet temperature within specifications at the point of entrance into a steam turbine; however, localized over-attemperation can occur. This over-attemperation often leads to condensate impacting directly on steam piping downstream of the attemperator, causing excessive thermal fatigue in the piping sections immediately downstream of desuperheaters/attemperators.

To date efforts have focused on manually (if at all) modifying a gas turbine's fuel-to-air (f/a) ratio to keep the HRSG design constraints satisfied. However, factors such as ambient temperature changes, turbine component degradation, etc., can necessitate periodic manipulation of the gas turbine's f/a ratio, at low loads, to ensure acceptable HRSG inlet conditions. Automated manipulation of the f/a ratio of a gas turbine utilizing real-time HRSG operational information, as well as real-time gas turbine operational information, provides an efficient means to maximize HRSG component life.

It is understood that manipulation of a gas turbine's fuel-air ratio will directly affect the engine's "tune", and as such any approach to accomplish this must be accompanied by another automated turbine control scheme to "re-tune" the turbine as-needed.

Mis-operation of the combustion system manifests itself in augmented pressure pulsations or increasing of combustion dynamics Pulsations can have sufficient force to destroy the combustion system and dramatically reduce the life of combustion hardware. Additionally, improper tuning of the combustion system can lead to emission excursions and violate emission permits. Therefore, a means to maintain the stability of the lean premixed combustion systems, on a regular or periodic basis, within the proper operating envelope, is of great value and interest to the industry. Additionally, a system that operates by utilizing near real-time data, taken from the turbine and HRSG sensors, would have significant value to coordinate modulation of fuel composition, fuel distribution, fuel gas inlet temperature, and/or overall machine f/a ratio (HRSG inlet temperature and airflow).

SUMMARY

Provided herein is a system and method for tuning the operation of a turbine and optimizing the mechanical life of a heat recovery steam generator. Provided therewith is a turbine controller, sensor means for sensing operational parameters, control means for adjusting operational control elements. The controller is adapted to tune the operation of the gas turbine in accordance preprogrammed steps in response to operational priorities selected by a user. The operational priorities preferably comprise optimal heat recovery steam generator life.

The present disclosure provides a controller and method for optimizing the fuel-air ratio of a gas-turbine combustor toward mitigating the detrimental effects of the turbine's exhaust conditions on the expected life of a Heat Recovery Steam Generator (HRSG) system, especially during low-load conditions. The gas turbine consumption system is of the type having sensor means for measuring operational parameters of the turbine and control means for controlling various operational elements of the turbine. The operational parameters of the turbine which are received by the controller include combustor dynamics, turbine exhaust temperature (overall fuel/air ratio), turbine exhaust emissions, and various heat recovery steam generator (HRSG) steam conditions. The operational control elements may include the fuel gas blend ratio (ratio of non-pipeline quality fuel gas to pipeline quality fuel gas), fuel distribution within the combustion system, fuel temperature and turbine exhaust temperature. The turbine/power plant system can also include a distributed control system (DCS) communicating with the sensor means and the control means. The tuning controller is normally connected to the turbine system through the DCS (although the tuning controller can connect directly to the gas turbine controller).

The tuning controller operates by receiving data from the sensor means. Operational priorities for the turbine are set within the controller and are typically selected from optimum NOx emissions, optimum power output, optimum combustor dynamics, optimum fuel gas blend ratio, and/or optimum HRSG life. The data received from the turbine sensors is compared to stored operational standards within the controller. The selected operational standards are based on the set operational priorities. A determination is made as to whether the turbine operation conforms to the operational standards. In addition, upon the data being out of conformance, a determination is made of the dominant tuning criteria again based on the preset operational priorities. Once the logical determinations are made, the tuning controller communicates with the operational control means through the DCS to perform a selected adjustment in an operational parameter of the turbine. The selected operational adjustment is based on the dominant tuning criteria and has a preset fixed incremental value and defined value range. Each incremental change is input over a set period of time, which is sufficient for the turbine to gain operational stability. Once the time period passes, operational data is again received from the turbine sensor means to determine if an additional incremental change is desired. Generally speaking, upon completing the adjustments within the defined range, a further operational parameter adjustment is selected, again based on the dominant tuning criteria, and a further fixed incremental adjustment is made within a defined range and over a set period of time. The tuning process continues by the controller receiving operational data to determine if the operation is conforming to the operational standards or whether an additional incremental adjustment is required. The operational parameters being adjusted by the tuning controller are preferably the fuel/air ratio within the gas turbine, the combustor fuel distribution split within the nozzles of the combustor, the fuel gas inlet temperature, and/or the fuel gas blend ratio.

It is understood that the tuning controller, when Optimum HRSG life is selected by the plant operator, will first evaluate what changes (if any) need to be made to the gas turbine f/a ratio to mitigate potential HRSG mechanical concerns and make these necessary changes. Subsequent to this optimization process, the tuning controller will tune the gas turbine, if needed, using the standard parameters of fuel splits, fuel gas temperature, and/or fuel gas composition (Note: gas turbine f/a ratio is not an option).

In a further aspect of the disclosure, the system performs a method for determination of the dominant gas turbine combustion system tuning scenario through the use of Boolean hierarchical logic and multiple levels of control settings.

In another aspect of the disclosure, the method performed relates to automated control of the gas turbine inlet fuel temperature through automated modification of the fuel gas temperature control set point within a Distributed Control System (DCS).

In a still further aspect of the disclosure, a method for automated control of a gas turbine inlet fuel temperature is defined by automated modification of the fuel gas temperature control set point within the fuel gas temperature controller.

In another aspect of the disclosure a method for communicating turbine control signals to a gas turbine controller is accomplished through the use of an existing gas turbine communication link with an external control device, such as, for example a MODBUS Serial or Ethernet communication protocol port existing on the turbine controller for communication with the Distributed Control System (DCS).

In a still further aspect of the disclosure a method for modification of a gas turbine combustion system is defined by a series of auto tuning settings via a user interface display, which utilizes Boolean-logic toggle switches to select user-desired optimization criteria. The method is preferably defined by optimization criteria based on Optimum Combustion Dynamics, Optimum NOx Emissions, Optimum Power, Optimum Heat Rate, Optimum CO Emissions, Optimum Heat Recovery Steam Generator (HRSG) Life, Optimum Gas Turbine Fuel Blend Ratio or Optimal Gas Turbine Turndown Capability whereby toggling of this switch changes the magnitude of the combustor dynamics control setting(s).

BRIEF DESCRIPTION OF DRAWINGS

For the purpose of illustrating the invention disclosed herein, the drawings show forms that are presently preferred. It should be understood that the invention is not limited to the precise arrangements and instrumentalities shown in the drawings of the present disclosure.

FIG. 10 shows a second example schematic of the determination of the system's dominant tuning concern, given various alarm inputs into the present disclosure.

FIG. 11 shows a third example schematic of the determination of the system's dominant tuning concern, given various alarm inputs into the present disclosure.

FIG. 12 shows a fourth example schematic of the determination of the system's dominant tuning concern, given various alarm inputs into the present disclosure.

DETAILED DESCRIPTION

The present disclosure generally relates to systems and methods for tuning the operation of combustion turbines. In the depicted embodiments, the systems and methods relate to automatic tuning of combustion turbines, such as those used for power generation. Persons of ordinary skill in the art will appreciate that the teachings herein can be readily adapted to other types of combustion turbines. Accordingly, the terms used herein are not intended to be limiting of the embodiments of the present disclosure. Instead, it will be understood that the embodiments of the present disclosure relate generally to the field of combustion turbines, and in particular for systems, methods and computer readable media for tuning of combustion turbines.

Figure 1:
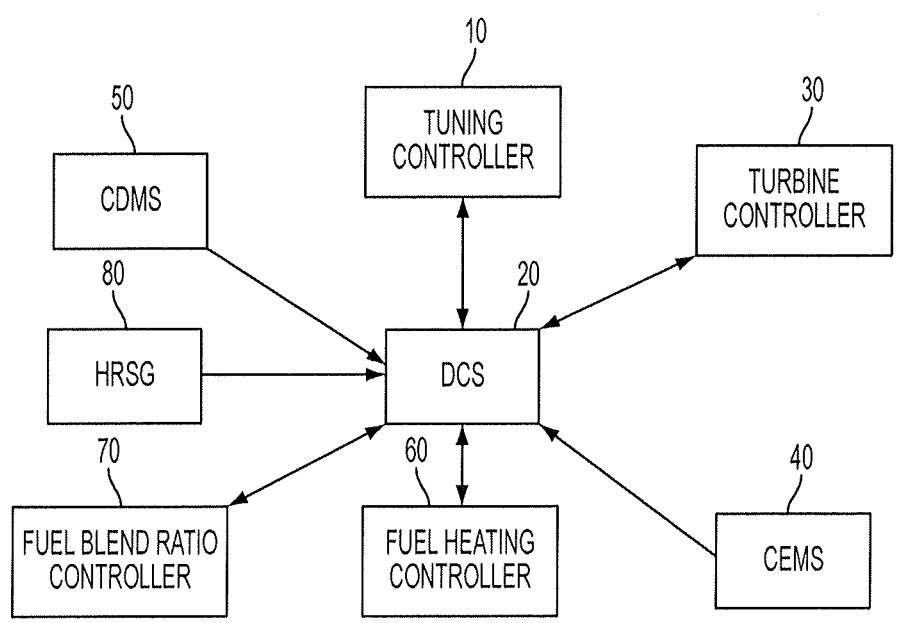
FIG. 1 shows an exemplary embodiment of a schematic representation of an operational plant communication system encompassing the gas turbine engine system, incorporating a gas turbine tuning controller as well as communication with various elements of the HRSG via plant DCS.

FIG. 1 is a communication diagram for a gas turbine engine (not shown), within which a tuning controller 10 of the present disclosure operates. A distributed control system (DCS) 20 serves as the main communication hub. As an alternative, a plant using the gas turbine controller as a DCS, may also have the tuning controller 10 communicate directly to the gas turbine controller 30. As a further alternative, the tuning controller 10 can communicate directly with the gas turbine controller 30, irrespective if the gas turbine controller 30 is functioning as a DCS. Most of the turbine control is performed through the DCS 20. A turbine controller 30 communicates directly with the gas turbine and with the DCS 20. In the present disclosure, information relevant to turbine operation, e.g., turbine dynamics, turbine exhaust emissions, etc. are directed through the DCS 20 to the tuning controller 10. The tuning controller 10 is contemplated to be a stand-alone PC used to run as a programmable logical controller (PLC). The tuning controller 10 is preferably a separate computer from the turbine controller 30 and does not normally communicate directly with the turbine controller 30, except through the DCS 20. However; as mentioned above, the tuning controller 10 can be configured to directly communicate with the gas turbine controller 30.

Figure 2:
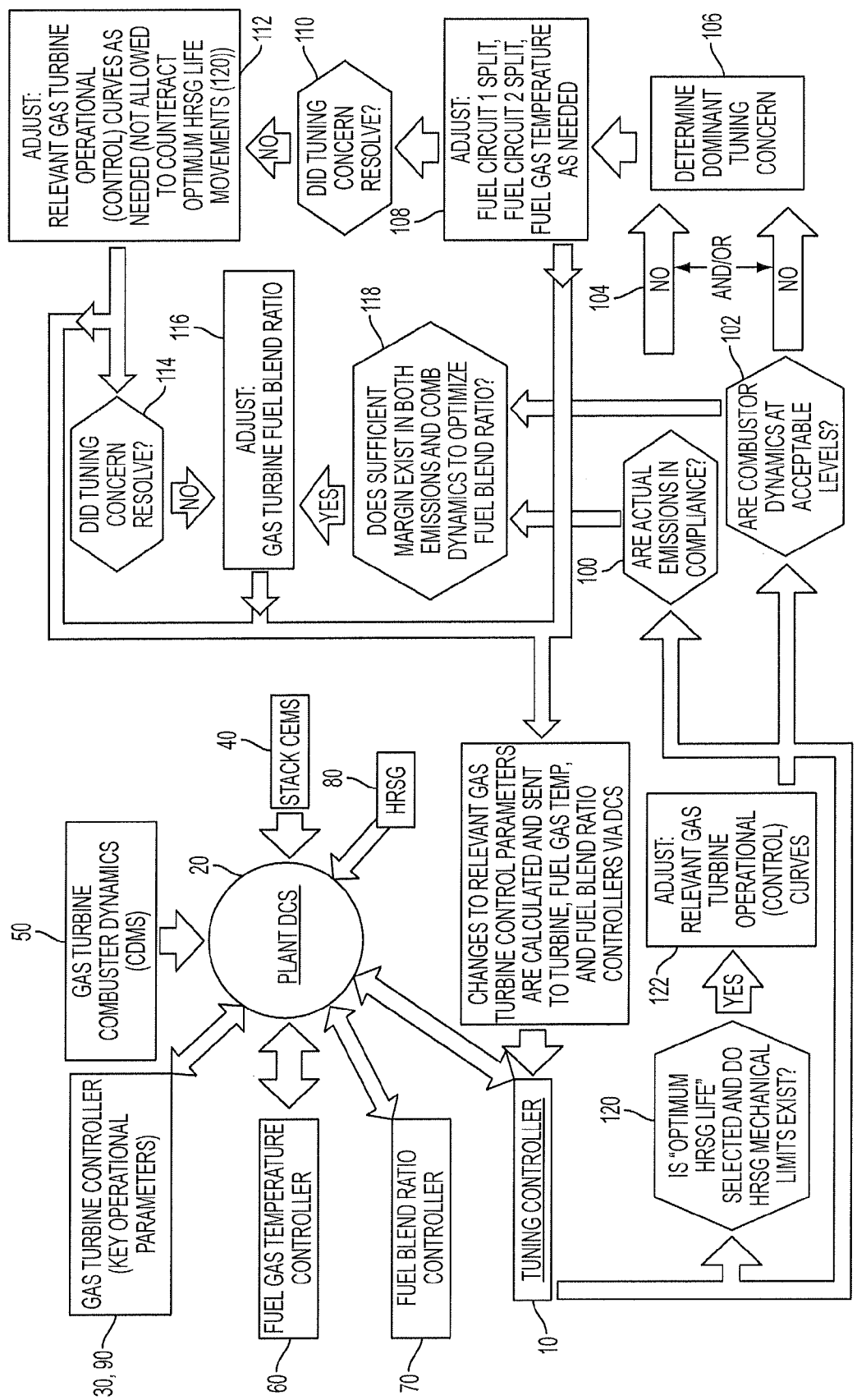
FIG. 2 shows an exemplary embodiment of a functional flow chart for the operation of a tuning controller according to the present disclosure.

Referring now to FIGS. 1 and 2, the tuning controller 10 is contemplated to be a stand-alone PC used to run as a programmable logical controller (PLC). The tuning controller 10 is preferably a separate computer from the turbine controller 30 that is in constant communication from with the turbine controller 30. The signals from the tuning controller 10 may also be transferred to the turbine controller 30 or other controls within the system by the use of an external control device, such as a MODBUS Serial or Ethernet communication protocol port existing on or added to the system.

The relevant operational data is received from sensor means associated with the turbine. For example, the turbine exhaust emission reading is taken from stack emissions by a continuous emissions monitoring system (CEMS) 40, which is connected to the DCS. Combustion dynamics is sensed using a dynamic pressure sensing probe located within the combustion region of the turbine combustor. As shown, a continuous dynamics monitoring system (CDMS) 50 is provided and communicates with the DCS. The CDMS 50 preferably uses either direct mounted or wave guide connected pressure or light sensing probes to measure the combustion dynamics. Another relevant operational parameter is the fuel gas temperature. Again, this temperature information is directed to the tuning controller 10 through the DCS 20 from the fuel heating controller 60. Since part of the tuning operation may include adjustment of the fuel temperature, there may be a two-way communication between the tuning controller 10 and the fuel heating unit 60. The DCS 20 communicates with a fuel blend ratio controller 70 to adjust the ratio of pipeline quality gas to non-pipeline quality gas (for subsequent consumption within the gas turbine). There exists in direct communication between the fuel blend ratio controller 70 and the tuning controller 10 via the DCS 20. Last, as part of this disclosure, certain key operating parameters of the HRSG 80 are sent to the tuning controller 30 via the DCS 20. If the tuning controller 10 determines that various parameters of the HRSG 80 are outside of allowable ranges, changes to the gas turbine f/a ratio are sent from the tuning controller 10 through the DCS 20 to the gas turbine controller 30.

Relevant operational data from the turbine and HRSG is collected several times per minute. This data collection allows for near real-time system tuning. Most relevant turbine and HRSG operational data is collected by the tuning controller 10 in near real-time. However, the turbine exhaust emissions sensor means is typically received by the tuning controller 10 with a 2 to 8 minute time lag from current operating conditions. This time lag necessitates the need for the tuning controller 10 to receive and buffer relevant information, for a similar time lag, before making operational tuning adjustments. This tuning controller 10 tuning adjustment time lag assures that all of the operational (including exhaust emissions) data is representative of a stable turbine operation before and after any adjustments have been made. Once the data is deemed stable, the tuning controller 10 determines whether there is a need for adjustment of tuning parameters. If no adjustment is necessary, the tuning controller 10 maintains the current tuning and waits to receive the next data set. If changes are desired, tuning commences. First, HRSG operational data are compared against HRSG component mechanical limits. If any HRSG mechanical limits (or margin against such limits) are violated, the tuning controller 10 will alter the gas turbine f/a ratio through the DCS 20 to the turbine controller 30. Subsequently, if there is sufficient margin in the key operational characteristics of the gas turbine (namely exhaust emissions and combustor dynamics), the tuning controller 10 can send a command (if applicable) to the fuel gas ratio controller 70 (through the DCS 20) to increase the ratio of non-pipeline quality gas to pipeline quality gas.

All determinations of the need for turbine tuning are performed within the tuning controller 10. The tuning operation is started based on an "alarm" created by receipt of operational data outside of preset operational criteria. In order for the tuning operation to be initiated, the alarm—and thus the data anomaly—must continue for a predetermined period of time.

One example of a tuning adjustment is the variation of the fuel nozzle pressure ratio to adjust combustion dynamics. With the requirement of higher firing temperatures to achieve greater flame temperatures and efficiency, turbine combustors must release more energy in a given combustor volume. Better exhaust emissions are often achieved by increasing the mixing rate of fuel and air upstream of the combustion reaction zone. The increased mixing rate is often achieved by increasing the pressure drop at the fuel nozzle discharge. As the mixing rate increases in combustors, the turbulence generated by combustion often leads to noise within the combustor and may lead to the generation of acoustic waves. Typically, acoustic waves are caused when the sound waves of the combustion flames are coupled with the acoustic characteristics of the combustor volume or the fuel system itself.

Acoustic waves may affect the internal pressure in the chamber. Where pressure near a fuel nozzle rises, the rate of fuel flowing through the nozzle and the accompanying pressure drop decreases. Alternatively, a decrease in pressure near the nozzle will cause an increase in fuel flow. In cases where a low fuel nozzle pressure drop allows fuel flow oscillation, a combustor may experience amplified pressure oscillations. To combat the pressure oscillations within the combustor, combustion dynamics are monitored and the fuel air ratio and fuel nozzle pressure ratio may be modified to reduce or eliminate unwanted variations in combustor pressure, thereby curing an alarm situation or bringing the combustion system back to an acceptable level of combustion dynamics.

As shown in FIG. 2, the data received from the sensing means for the HRSG operational parameters (80), combustor dynamics (50), turbine exhaust emissions (40), and other relevant turbine operating parameters (30) are directed through the DCS (20) to the tuning controller (10). These input values are then compared to standard or target operational data for the turbine. The stored operational standards are based, at least in part, on the operational priority settings for the turbine. These priority settings are defined on the main user interface 12 of the tuning controller 10 and are shown graphically in FIG. 3. Based on the priority settings, a series of adjustments are made to the operation of the turbine by the turbine controller 10 connected through the DCS 20. The adjustments are directed to the control means, including the fuel heating unit 60 (FIG. 1), fuel blend ratio controller 70, and various other operational elements 90 of the turbine (FIG. 2).

Figure 3:
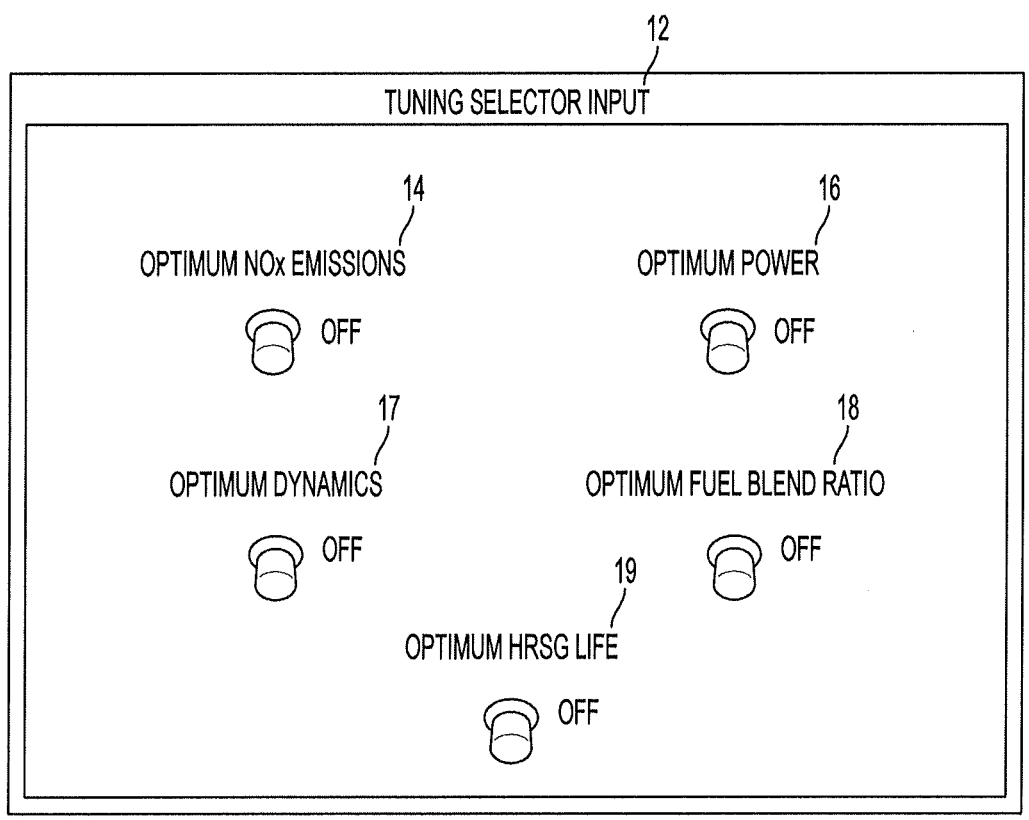
FIG. 3 shows an exemplary embodiment of a user interface display for selecting the optimization mode within the present disclosure.

The interface display 12 shown in FIG. 3 is comprised of switches (each having an On/Off indication). These switches allow the user to specify the desired tuning priorities for the operation of the turbine. The switched operational priorities include optimum NOx emissions 14, optimum power 16, optimum combustor dynamics 17, optimum fuel blend ratio 18, and optimum HRSG life 19. Each of these switches is set by the user to adjust the preferred operation of the turbine. Within the tuning controller are functions that operate within the priorities set by the switches. Preferably, if both the optimum NOx emissions switch 12 and the optimum power switch 14 are set to "On", the controller 10 will run in the optimum NOx mode, not optimum power. Thus, to run in optimum power mode, the optimum NOx emissions switch 12 must be "Off". Optimum dynamics 17 can be selected at any time. It is explicitly noted that other User-Interface Toggle Switches (not shown) may be used, including parameters such as Optimum Heat Rate, Optimum CO emissions, Optimum Heat Recovery Steam Generator (HRSG) Life, Optimum Gas Turbine Fuel Blend Ratio, Optimal Gas Turbine Turndown Capability, etc.

Figure 4:
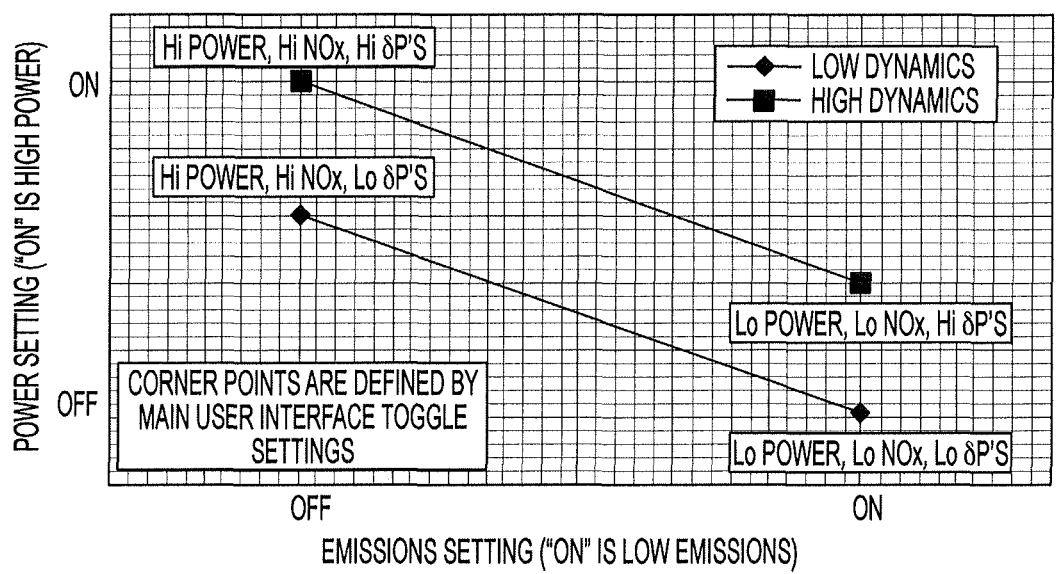
FIG. 4 shows an exemplary schematic of the interrelationship of various optimization mode settings.

FIG. 4 shows a graphical representation of the interrelationship of the interface display switches. As shown, switching one parameter "On" will alter the alarm limits to a different level than their "Off" level. In the example shown in FIG. 4, the alarm limits are shown with both Optimum NOx and optimum power in the "On" position and in the "Off" position. These points on the graph are then modified by the selection of optimum dynamics (represented throughout by the symbol δ) in either the "On" or "Off" position. The points shown on the graph of FIG. 4 represent an exemplary set of limits for dynamics, based on the user's selected operational priorities.

Returning to FIG. 2, there is shown a representation of the logical flow of the determinations and calculations made within the tuning controller 10. The tuning controller 10 receives the actual operating parameters of the turbine through the turbine controller 30, combustor dynamics through the CDMS 50, turbine exhaust emissions through the CEMS 40, and relevant HRSG operating parameters 80. This sensor data is directed to the tuning controller 10 through the DCS 20. The received sensor data is compared to stored operational standards to determine if the turbine operation is conforming to the desired settings. The operational standards are based on the preset operational priorities of the turbine, defined by the switches 14, 16, 17, 18, and 19 on the main user interface display 12 of the tuning controller 10 (FIG. 3).

Based on the preset operational priorities, a hard-coded hierarchical Boolean-logic approach determines the dominant tuning criteria based on operational priorities. From this logical selection, the tuning controller 10 implements a fixed incremental adjustment value for changing an operational parameter of the turbine within a maximum range of adjustment (e.g., high and low values). The tuning changes are made in a consistent, pre-determined direction over a pre-determined increment of time and are dependent on the dominant tuning criteria at present. It is contemplated that no formulaic or functional calculations are made to determine the magnitude of tuning adjustments; rather, the incremental adjustments, the direction of the adjustments, the time span between adjustments, and the maximum range for the adjustments for each parameter and for each tuning criteria are stored in the tuning controller 10.

As shown in FIG. 2, when Optimum HRSG Life 19 is not selected by the operator, the tuning controller 10 determines whether the emissions are in compliance 100 and whether the combustor dynamics are at acceptable levels 102. If both are in compliance with the set operational standards, the tuning controller 10 waits for the next data set from the CEMS 40 or the CDMS 50, and for other turbine operational data 90. If both are in compliance with the set operational standards and possess sufficient operational margin, and Optimum Fuel Blend Ratio 18 is selected, the tuning controller 10 will send a command to the fuel blend ratio controller 70 to increase the ratio of non-pipeline quality gas to pipeline quality gas. If the received data is non-conforming with the operational standards, i.e. above or below alarm levels, as is the case with step 104 of FIG. 2, the tuning operation moves to the next tuning step of first determining the dominant tuning concern 106. The logical adjustment of turbine operation is defined by the dominant tuning criteria 106, which is based, at least in part, on the preset operational priorities set within the user interface 12, as will be discussed below with respect to FIG. 8.

If Optimum HRSG Life 19 is selected by the operator, the first decision the tuning controller makes is an assessment of the margin of pertinent HRSG parameters (including but not limited to high pressure superheat outlet steam temperature, hot reheat outlet steam temperature, high pressure superheat steam desuperheater margin against saturation (degrees Fahrenheit of temperature immediately downstream of attemperator compared to saturation temperature), hot reheat steam desuperheater margin against saturation) against design limits. These temperature margins are compared against allowable margins as defined by the user. If the actual temperature margins are less than the allowable margins, the tuning controller 10 will automatically adjust the turbine controller's f/a ratio 122. In this particular case, the tuning controller 10 has first adjusted the gas turbine's f/a ratio for an external reason (HRSG component life). This change can adversely affect the gas turbine's current state-of-tune. Therefore, the normal gas turbine tuning scheme is performed by the tuning controller 10; however, changes to the turbine's f/a ratio are not allowed. The remaining gas turbine tuning scheme is defined below.

In a preferred operation, the tuning controller 10 will first attempt to change the turbine combustor fuel splits 108. The fuel split determines the distribution of the fuel flow to the fuel nozzles in each combustor. It should be noted that while the current embodiment indicates the presence of two adjustable fuel circuits, this approach can be utilized for one, two or more fuel circuits. If these adjustments do not resolve the tuning issue and do not place the operational data back into conformance with the operational standards, a further adjustment is performed. In certain situations or if the efficacy of fuel split changes on resolving high combustor dynamics is low, the next incremental adjustment is a change of the fuel gas temperature set point. In this adjustment step, the tuning controller 10 sends a modified fuel gas inlet temperature signal to the DCS 20, which is directed to the fuel heating unit 60.

Referring again to FIG. 2, if modification of the combustor fuel splits and/or fuel gas inlet temperature does not resolve the tuning issue 110, the tuning controller 10 will then alter the overall fuel/air ratio 112. This approach makes changes to the turbine thermal cycle utilizing fixed incremental changes over pre-determined amounts of time. The step is intended to adjust the exhaust temperature (up or down) by adjusting the air to fuel ratio in accordance with predetermined, standard control curves for the turbine operation, which are maintained within the memory of the tuning controller 10. If changes made to the gas turbine's overall fuel/air ratio do not resolve the tuning issue 114 or if Optimum HRSG Life 19 is enabled and HRSG mechanical concerns exist, the tuning controller 10 will adjust the fuel blend ratio 116.

In the present disclosure, it is contemplated that all control changes directed by the tuning controller 10 are fed back to the turbine system (30, 90), fuel gas temperature controller 60, and fuel blend ratio controller 70 through the DCS 20. However, the tuning controller 10 can be configured to communicate directly with the turbine controller 30. These changes are implemented directly within the various controller means within the system or through the turbine controller 30. When the operational data is returned to the desired operational standards, the tuning settings are held in place by the tuning controller pending an alarm resulting from non-conforming data received from the sensor means through the DCS.

The adjustments sent from the tuning controller 10 to the turbine controller 30 or the associated controller (60, 70) means are preferably fixed in magnitude. Thus, the adjustments are not recalculated with new data or optimized to a target. The adjustments are part of an "open loop". Once started, the adjustments move incrementally to the preset maximum or maximum within a specified range, unless an interim adjustment places the operation data into conformance with the operational standards. Under most circumstances, when the full incremental range for one operational parameter is completed, the tuning controller moves on to the next operational parameter, which is defined by the preset operational priorities. The specific order of operational control elements is not fixed, and can be determined by operational priorities. The logic of the tuning controller drives the operational control element adjustment based on a "look-up" table stored within the memory of the tuning controller and preset operational priorities.

The tuning controller preferably addresses one operational parameter at a time. For example, the dominant tuning criteria dictates the first adjustment to be made. In the preferred example discussed above, the fuel distribution/split parameter is first adjusted. As indicated in FIG. 2, the fuel split of fuel circuit 1 is first addressed, followed by the split for fuel circuit 2. Again, this method can be applied to any combustion system with one or more adjustable fuel circuits. The fuel gas inlet temperature adjustment generally follows the fuel split adjustments when needed. Within each step, there is an incremental adjustment, followed by a time lag to permit the adjusted turbine operation to stabilize. After the time lag, if the current operational data analyzed by the tuning controller indicates that turbine operation still remains outside of the operational standards, the next incremental adjustment within the step is made. This pattern repeats for each step. Under most circumstances, only when one adjustment step is completed does the tuning controller move onto the next operational parameter. It should be noted that there exists an over-riding loop whereby the tuning controller 10 will directly increase the non-pipeline quality gas blend ratio (through the fuel blend ratio controller 70) if key turbine operational characteristics possess ample operational margin (against alarm conditions) 118. The control methodology of this over-riding control loop is identical to that mentioned above for fuel splits and turbine f/a ratio—a change is made in a pre-defined direction, a pre-defined amount, in a pre-defined amount of time.

The tuning controller preferably controls combustion operation to maintain proper tuning in variable conditions of ambient temperature, humidity and pressure, all of which vary over time and have a significant effect on turbine operation. The tuning controller may also maintain the tuning of the turbine during variation in fuel composition. Variation in fuel composition may cause a change in the heat release, which can lead to unacceptable emissions, unstable combustion, or even blow out. The tuning controller will adjust the fuel composition entering the turbine indirectly through changes in the fuel blend ratio 116.

Another aspect regarding fuel splits within the combustor deals directly with combustion systems having a series of outer nozzles (of the same type, controlled by an outer fuel split affecting circumferential distribution of fuel within the outer fuel nozzles) in combination with a center nozzle (of same or different type compared to outer nozzles, controlled by an inner/center fuel split). Within this framework, the center nozzle can either operate with a "rich" or "lean" fuel-to-air ratio, as compared to the f/a of the outer fuel nozzles. Most combustion tuning keeps the combustion system either on a "lean center nozzle" or a "rich center nozzle" mode of operation. In some circumstances, better flame stability can be achieved with a "rich center nozzle" fuel split profile when compared to a "lean center nozzle"; however, this normally results in higher NOx emissions, Therefore, a hybrid fuel schedule is of particular interest, whereby the combustion system utilizes a "lean center nozzle" fuel split schedule at higher load conditions (where flame stability is less of a concern but NOx emissions are more of a concern) transitioning to a "rich center nozzle" fuel split schedule at lower load and turndown conditions (where flame stability is more of a concern and NOx is less of a concern). The system of the present disclosure determines which fuel split schedule is employed (rich or lean center nozzle) at each operating point (allowing for the use of a hybrid fuel split schedule), and adjusts the fuel split schedule (Fuel Circuit 1 Split and Fuel Circuit 2 Split) in the proper direction. Again, changes made are of fixed magnitude in fixed time intervals.

Another point regarding fuel splits deals directly with combustion systems having a series of outer nozzles (of same or different type, controlled by an outer fuel split affecting circumferential distribution of fuel within the outer fuel nozzles) with no center nozzle. Within this framework, a subset of these outer nozzles (referred to generally as minor circuit 1) can either operate with a "rich" or "lean" fuel-to-air ratio, as compared to the f/a of the remaining outer fuel nozzles (referred to as major circuit 1). Most combustion tuning keeps the combustion system either on a "lean minor circuit 1" or a "rich minor circuit 1" circumferential fuel split mode of operation. In some circumstances, better flame stability can be achieved with a "lean minor circuit 1" fuel split profile when compared to a "rich minor circuit 1" fuel split profile; however, this can result in higher NOx emissions. Therefore, a hybrid fuel schedule is of particular interest, whereby the combustion system may utilize a "rich minor circuit 1" fuel split schedule at higher load conditions (where flame stability is less of a concern but NOx emissions are more of a concern) transitioning to a "lean minor circuit 1" fuel split schedule at lower load and turndown conditions (where flame stability/CO is more of a concern and NOx is less of a concern). The system of the present disclosure determines which fuel split schedule is employed (rich or lean minor circuit 1) at each operating point (allowing for the use of a hybrid fuel split schedule), and adjusts the fuel split schedule (Fuel Circuit 1 Split and Fuel Circuit 2 Split, if applicable) in the proper direction. Again, changes made are of fixed magnitude in fixed time intervals.

One further aspect regarding fuel splits deals directly with combustion systems having one or more annular rings of fuel nozzles (of same or different type, controlled by an circumferential fuel split affecting circumferential distribution of fuel within each ring of fuel nozzles), whereby a second family of fuel splits may be available (if more than one annular ring of fuel nozzles exists) which adjusts the relative (radial) amount of fuel to each of the radially concentric fuel rings (ring 1, ring 2, etc.). Within this framework, a subset of each ring's fuel nozzles (referred to as minor circuit ring 1, minor circuit ring 2, etc.) can either operate with a "rich" or "lean" fuel-to-air ratio, as compared to the f/a of the remaining ring's fuel nozzles (referred to as major circuit ring 1, major circuit ring 2, etc.). Most combustion tuning keeps the combustion system either on a "lean minor circuit ring 1" or a "rich minor circuit ring 1" (and similar approaches for rings 2, 3, etc.) circumferential fuel split mode of operation. In some circumstances, better flame stability can be achieved with, using ring 1 as an example, a "lean minor circuit ring 1" fuel split profile when compared to a "rich minor circuit ring 1" fuel split profile; however, this can result in higher NOx emissions. Therefore, a hybrid fuel schedule is of particular interest, whereby the combustion system may utilize a "rich minor circuit ring 1" fuel split schedule at higher load conditions (where flame stability is less of a concern but NOx emissions are more of a concern) transitioning to a "lean minor circuit ring 1" fuel split schedule at lower load and turndown conditions (where flame stability/CO is more of a concern and NOx is less of a concern). The system of the present disclosure determines which fuel split schedule is employed for each ring, if applicable (rich or lean minor circuit ring 1, rich or lean minor circuit ring 2, etc.) at each operating point (allowing for the use of a hybrid fuel split schedule), and adjusts the fuel split schedule (Fuel Circuit 1 Split and Fuel Circuit 2 Split, if applicable) in the proper direction. Again, changes made are of fixed magnitude in fixed time intervals.

Figure 5:
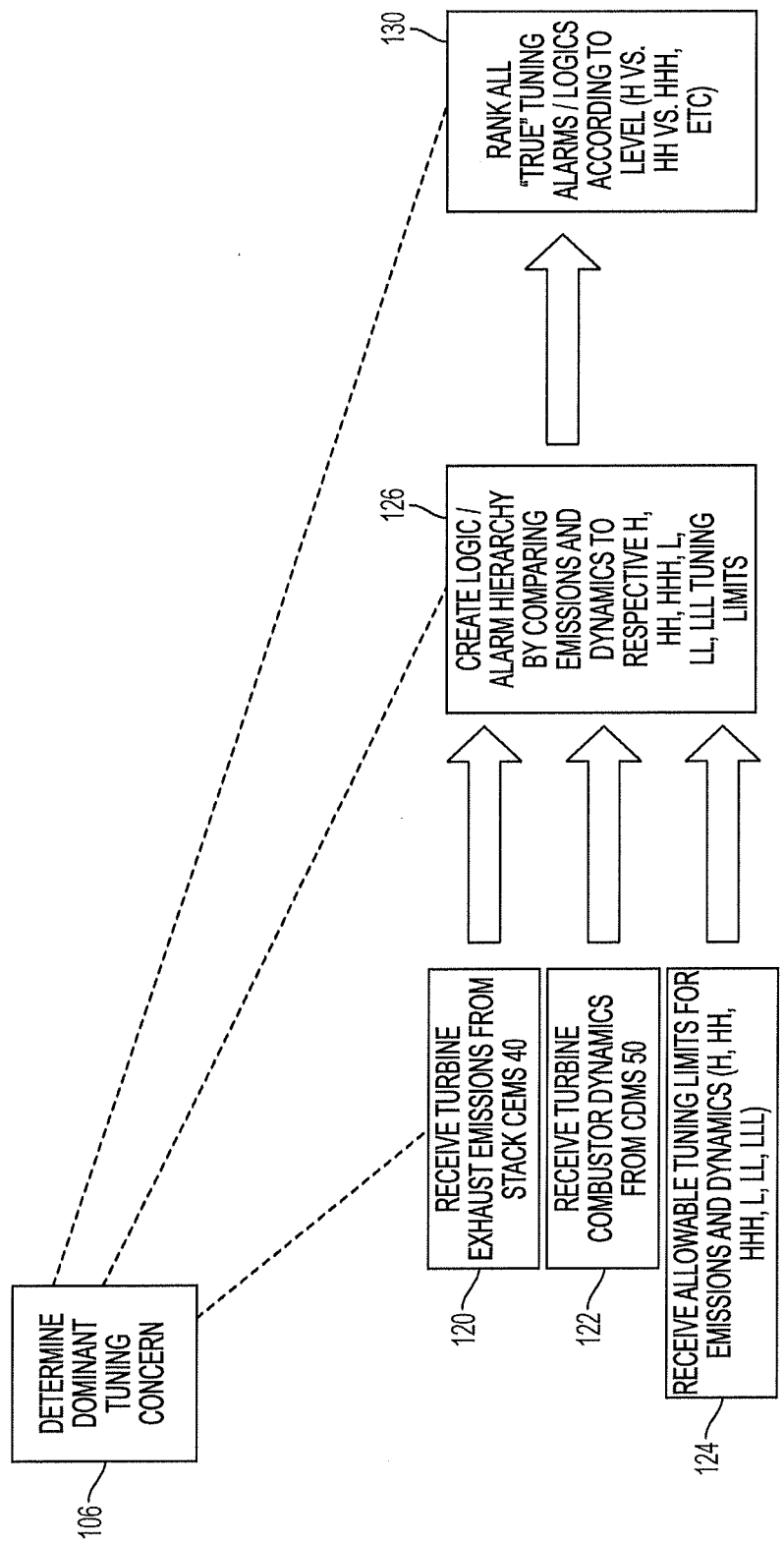
FIG. 5 shows an exemplary overview schematic of the process steps utilized to determine the alarm signals triggered according to the present disclosure.

FIG. 5 provides a schematic that details the framework for determining the dominant tuning concern 106, as included in FIG. 2. Future steps will be described below with respect to FIG. 8. First, relevant emissions parameters 120 and combustor dynamics 122 are received by the tuning controller 10 from the CEMS 40 and CDMS 50, as detailed above. The relevant emissions parameters 120 and combustor dynamics 122 are then compared to allowable tuning limits 124 that are also provided to the tuning controller 10. The allowable tuning limits are in the form of preset ranges that may be adjusted using the tuning interface 12 of FIG. 3 and determined according to the logic set forth below with respect to FIGS. 6 and 7. The output of this comparison is a series of "True" alarms 126 of various tuning concerns, where an alarm condition is indicated if the sensed operational data 120, 122 is above or below a given alarm range set forth in the tuning limits 124.

Figure 8:
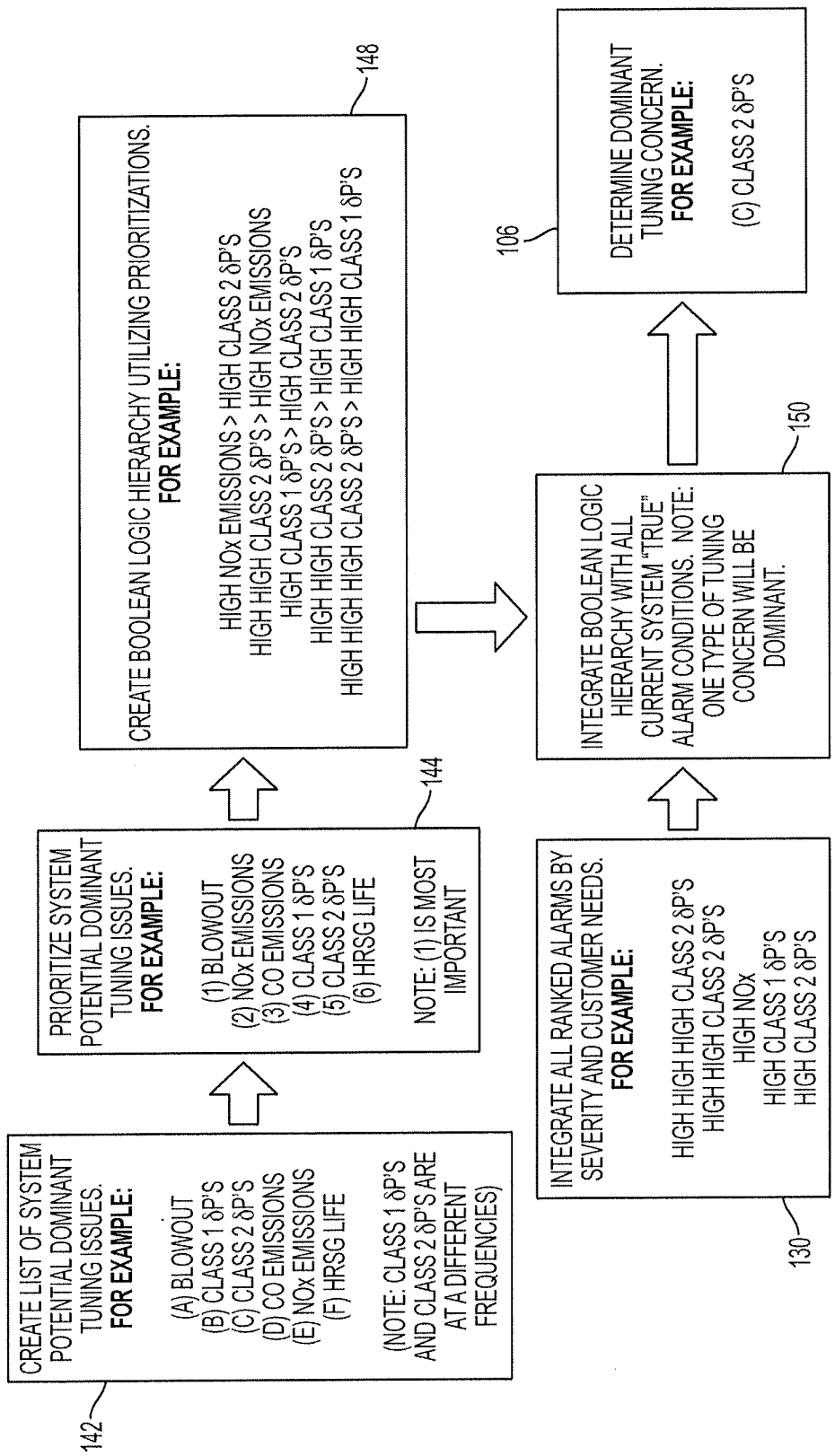
FIG. 8 provides a further detailed exemplary schematic of the steps the present disclosure utilizes to determine the dominant tuning concern.

Alarm conditions may have more than one level or tier. For example, there may be varying degrees of severity of an alarm, such as: high "H"; high-high "HH"; high-high-high "HHH" and low "L"; low-low "L"; low-low-low "LLL". The "True" logical alarms 126 are subsequently ranked according to their level of importance (e.g. high-high "HH" alarms are more important than high "H" alarms, etc.) in step 130. If more than one tuning concern shares the same level, the tuning concerns will then be ranked according to the user preferences as set forth below with respect to FIG. 8. If only one "True" alarm emerges, this will be selected and used as the dominant tuning concern 106 to initiate the tuning process as set forth in FIG. 2. However, the results of the process of FIG. 5, namely the ranked "True" alarms 130, will be processed through user determined criteria, as shown in FIG. 8, before a dominant tuning concern 106 is confirmed.

Figure 6:
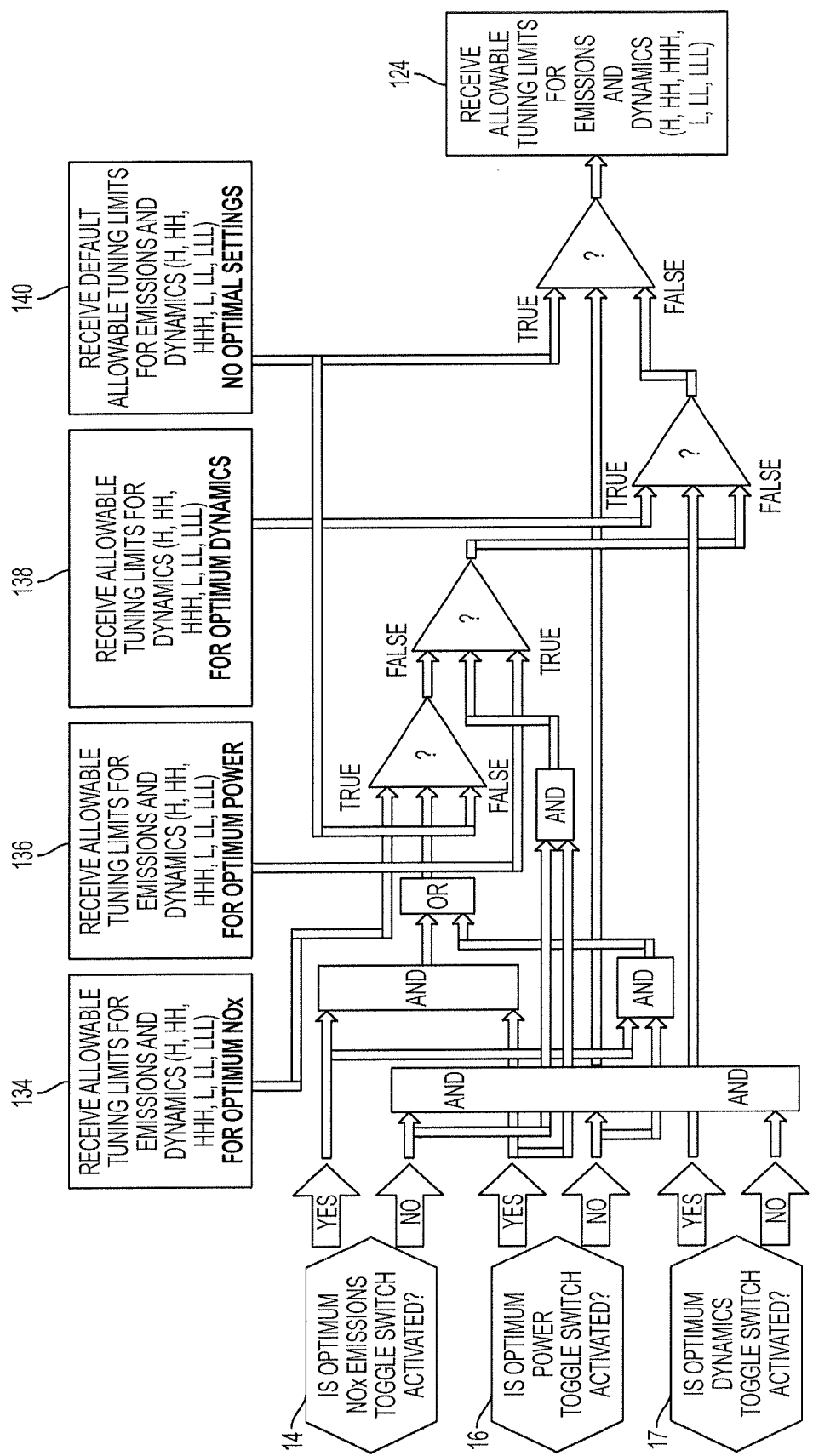
FIG. 6 shows an exemplary process overview of the steps to determine allowable turbine tuning parameters.

In FIG. 6, a flow chart is provided to explain how the allowable tuning limits 124 are determined. Once determined, the tuning limits 124 are compared to the operational data 120, 122 as set forth above and shown in FIG. 5. First, the User Interface Toggle Switches 14, 16, 17 corresponding to those in the interface display 12 of FIG. 3, are compared against each other, utilizing an internal hierarchy to allow passage of the alarm constraints relative to the most significant toggle switch. Thus, depending on which switches are in the "On" position, different tuning limits will be included in the allowable tuning limits 124. Each of Optimum NOx, Optimum Power and Optimum Dynamics has a collection of preset limits (denoted by the numerals 134, 136 and 138 in FIG. 6), depending on whether the corresponding toggle switch 14, 16, 17 is in the "On" of "Off" position. There is also an internal set of default limits 140 to be used when none of the toggle switches are in the "On" position.

The internal hierarchy will determine which tuning limits shall take precedence in the event that competing toggle switches 14, 16 or 17 are in the "On" position. In the present example, the hierarchy ranks Optimum NOx 14 above Optimum Power 16. Optimum Dynamics 17 may be selected at any time and will simply alter the tuning limits of the other selections given, such as is shown in FIG. 4. If Optimum NOx 14 and Optimum Power 16 are both in the "On" position, the tuning limits for Optimum NOx 134 will be used. Additionally, the tuning limits for Optimum Dynamics 138 are utilized if this toggle switch 17 is activated. If no User Interface Toggle Switches 14, 16, 17 are active, default tuning limits 140 are provided as the allowable tuning limits 124. All of the tuning limits 134, 136, 138 and 140 that may be used to construct the allowable tuning limits for the tuning controller 10 may be developed by the end user and programmers and are then preferably hard coded into the tuning controller 10 for a given application. The methodology outlined in FIG. 6 is meant to provide an exemplary framework for incorporation of a number of different User Interface Toggle Switches, such as those options set forth above with respect to FIG. 3 including Optimum HRSG Life 19, whereby only a subset are specifically outlined in this disclosure.

Figure 7:
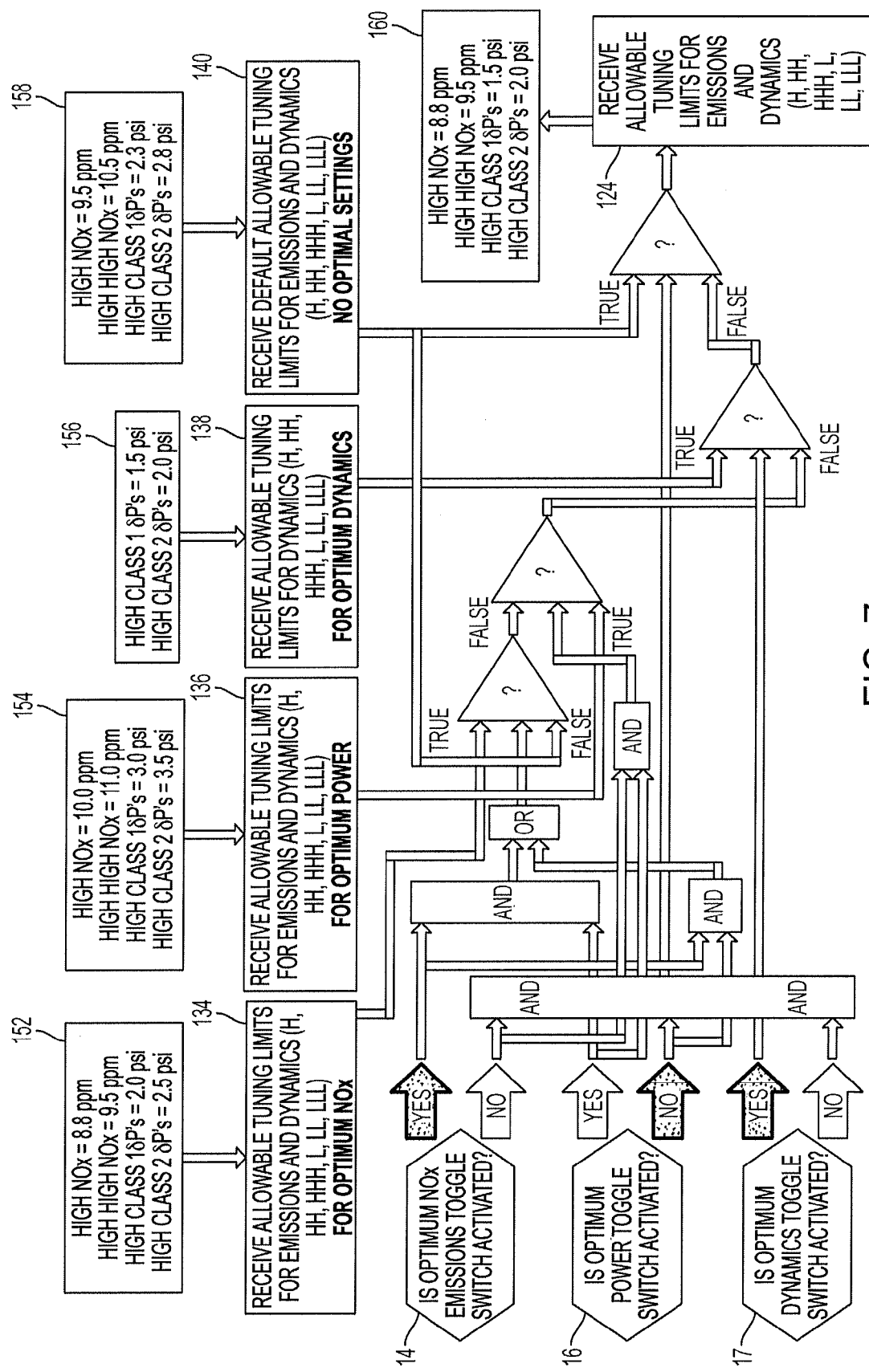
FIG. 7 shows a further detailed exemplary process according to the steps shown in FIG. 6.

FIG. 7 shows a specific example of the flow chart of FIG. 6 given for the determination of a subset of the system's allowable tuning limits. In this example, the tuning limits for High NOx, High HighNOx, High Class 1 δP's, High Class 2 δP's will be determined based on preset tuning limits and the user's preferences. The various exemplary tuning limits are provided for Optimum NOx 134, Optimum Power 136, Optimum Dynamics 138, and No Optimal Settings 140 are given corresponding numerical values (shown respectively in blocks 152, 154, 156 and 158). The corresponding numerical values given for each criterion vary, such that the allowable limits 124 will be different depending on which toggle switches 14, 16 or 17 are selected. By way of example, the Optimum NOx 134, 152 and Optimum Power 136, 154 give limits for NOx, but also provide limits for Dynamics that are to be used in the event that Optimum Dynamics 138, 156 is not selected. However, in the event that the Optimum Dynamics toggle 17 is selected, the Class 1 δP's and Class 2 δP's values provided therefore 156 shall be used instead of the values listed with respect to Optimum NOx 134, 152 and Optimum Power 136, 154.

In this particular example, the toggle switches for Optimum NOx 14 and Optimum Dynamics 17 are selected, with the switch for Optimum Power 16 left in the "Off" position. Thus, the values from Optimum NOx for High NOx and High HighNOx 152 are provided. Also, because Optimum Dynamics 17 is also selected, the Dynamics values for High Class 1 δP's and High Class 2 δP's 138, 156 replace those δP's values provided with respect to Optimum NOx 134, 152. As a result, the allowable tuning limits 124 are provided as shown in block 160. These allowable tuning limits 124 correspond to those used in FIG. 5, as described above, to determine whether information from the CEMS 40 and CDMS 50 is in an alarm state or operating normally.

FIG. 8, shows a further schematic for the process of incorporating a user's priorities and the "True" alarm conditions received for determining the dominant tuning concern 106. It is this tuning concern 106 which dictates the turbine operational changes the turbine controller 10 performs, as shown in FIG. 2.

First, a determination is made of all potential dominant tuning issues 142. These include, but are not limited to: combustor blowout, CO emissions, NOx emissions, Class 1 combustor dynamics (Class 1 δP's), Class 2 combustor dynamics (Class 2 δP's), and HRSG mechanical life, The list of potential dominant tuning issues 142 is determined by the user and programmer and may be based on a number of factors or operational criteria. By way of example, Class 1 and Class 2 combustor dynamics δP's refer to combustion dynamics occurring over specific ranges of acoustic frequencies, whereby the range of frequencies is different between Classes 1 and 2. Indeed, many combustion systems can possess different acoustic resonant frequencies corresponding to Class 1 and Class 2, and variations in these 2 dynamics classes may be mitigated utilizing different turbine operational parameter changes for each different turbine and/or combustor arrangement. It should also be noted that certain combustion systems may have none, 1, 2, or greater than 2 different "classes" (frequency ranges) of combustor dynamics which can be tuned. This disclosure utilizes a system whereby 2 different combustor dynamics classes are mentioned. However, it is fully intended that this disclosure can be broadly applied to any number of distinct dynamics frequency classes (from 0 to greater than 2).

After determination of the potential dominant tuning issues 142, these issues are ranked in order of significance 144 according to the end user's needs as well as the detrimental effects that each tuning concern can have on the environment and/or turbine performance. The relative importance of each potential dominant tuning concern can be different with each end user, and for each combustor arrangement. For example, some combustion systems will demonstrate an extreme sensitivity to combustor dynamics, such that normal daily operational parameter variations can cause a normally benign dynamics tuning concern to become catastrophic in a very short amount of time. In this case, one or both of the dominant dynamics tuning concerns (Class 1 and Class 2) may be elevated to Priority 1 (Most Important). By way of example in FIG. 7, combustor blowout is listed as the most important Dominant Tuning Concern 144. This ranking is used to determine the dominant tuning concern in the event that there are multiple alarms with equal levels of severity. This ranking of Dominant Tuning Concerns 144, from most to least important, provides the overall framework where the specific Boolean Logic Hierarchy 148 is created. For example, assuming Class 1 and Class 2 $\delta P$'s obey generally monotonic behavior relative to perturbations in system operational parameters, a High-High "HH" Class 2 $\delta P$'s alarm may be more significant than High "H" Class 1 $\delta P$'s alarm. Additionally, in the example given in FIG. 8 for the Boolean Logic Hierarchy 148, High "H" NOx emissions is more significant than High "H" Class 2 dynamics. This means that if both High "H" NOx and High "H" Class 2 dynamics are both "in alarm" (Logic=True), in the absence of other alarms being "True", the autotuning system will tune for High "H" NOx because it is the dominant tuning concern. Finally, it can be seen that Blowout is ranked above NOx Emissions and both are ranked above Class 1 $\delta P$'s. Thus, if there were high "H" alarms returned for all three categories, Blowout would be the dominant tuning concern, followed by NOx Emissions and then Class 1 $\delta P$'s. This Boolean Logic Hierarchy 148 will be what is compared to the "True" alarms 130 returned by comparing the allowable tuning limits 124 to the operational data 120, 122 as set forth above with respect to FIG. 5.

All "True" tuning alarms 130 are provided as ranked by severity (e.g. HHH above HH, etc.). The "True" tuning alarms 130 are then compared with the hard-coded Boolean Logic Hierarchy 148, in step 150 to determine which tuning will become the "True" Dominant Tuning Concern 106. This one "True" Dominant Tuning Concern 106 is now passed into the remainder of the autotuning algorithm, as detailed in FIG. 2, as the Dominant Tuning Concern 106 to be mitigated by operational changes.

Thus the tuning controller 10 may be configured to optimize the mechanical life of a Heat Recovery Steam Generator (HRSG) through the manipulation of the gas turbine exhaust temperature (turbine fuel air (f/a) ratio) when key HRSG operational characteristics indicate insufficient design margin against over-temperature (at steam outlet conditions) and/or over-attemperation (at intra-stage desuperheater). The HRSG will have sensors for measuring operational parameters of the boiler, and the turbine having sensor means for measuring operational parameters of the turbine, as discussed above. The HRSG operational parameters include high pressure and/or hot reheat steam outlet temperatures and/or high pressure and/or hot reheat intra-stage desuperheater outlet temperatures and pressures. The turbine operational parameters include combustor dynamics and turbine exhaust emissions. Using the logic applied above with respect to alarm levels, the turbine controller will adjust various operational control elements, such as fuel distribution and/or fuel-to-air (f/a) ratio, as needed.

The control system for optimizing HRSG life is set forth above in FIG. 1 and (optionally) relies on the turbine controller 10 communicating through the DCS 20 to the sensor means and the control means listed above to control the operational control elements of the turbine. In order to maximize HRSG life in light of other potential operational priorities, a user will select operational priorities for HRSG and/or other turbine operation, selected from the group comprising optimum NOx emissions, optimum power output, optimum combustor dynamics, optimum HRSG life, and/or optimum fuel blend ratio (ratio of non-pipeline quality gas to pipeline quality gas). The below examples will be provided for instances where the Optimum HRSG Life 19 is selected in the control panel shown in FIG. 3, such that Optimum HRSG Life is an operating priority, potentially in addition to other selected priorities.

During operation, the turbine controller will receive operational data from the gas turbine sensor means and the HRSG sensor means. The operational data will be compared to stored operational standards, based on the selected operational priorities. Using this comparison, the turbine controller will determining if both the HRSG and gas turbine operation conform to the operational standards.

To the extent that either the HRSG or gas turbine operational parameters are not within allowable limits, the tuning controller 10 will determine the dominant tuning criteria for non-conforming operation of the HRSG and/or the gas turbine, based on the preset operational priorities. With the dominant tuning criteria determined, the turbine controller 10 will communicate with the selected operational control elements to perform a selected adjustment in the operational control element of the gas turbine. The operational control element may be combustor fuel distribution split within the nozzles of the combustor, fuel gas inlet temperature, fuel/air ratio within the turbine, and/or gas fuel blend ratio (fuel composition). The adjustment to the operational control element will be based on the dominant tuning criteria and have a fixed incremental value and defined range, each incremental change input over a set period of time sufficient for the turbine to gain operational stability.

The sensing process will be repeated in open loop fashion, such that the turbine controller will subsequently receive further data regarding the operational parameters from the HRSG and gas turbine sensor means upon passage of a set period of time to determine if an additional incremental change is desired. If additional tuning is required, further incremental adjustments will be made to the operational control element within a defined range. To the extent that the range of available adjustments to a particular control element are exhausted, the tuning controller 10 will select a further operational control element adjustment based on the dominant tuning criteria, the further selected adjustment having a fixed incremental value and defined range, with each incremental adjustment made over a set period of time sufficient for the turbine to gain operational stability. The sensing and adjustment (if needed) process will be continued during the operation of the turbine and HRSG.

In one embodiment, the system can be programmed with stored operational data, such that the mechanical life of an HRSG is optimized in the tuning process by first adjusting the fuel-to-air ratio of the gas turbine in increments to change the HRSG hot gas inlet conditions to provide sufficient design margin in key HRSG operational parameters (i.e. lowering or raising the temperature of the hot gas inlet).

The tuning can then continue as may be required as a result of these changes made to the turbine's f/a ratio. For example, the HRSG may be provided with sensor means for measuring operational parameters of the associated boiler, including high pressure and/or hot reheat outlet steam temperatures as well as high pressure and/or hot reheat intra-stage desuperheater outlet temperatures and pressures. The gas turbine having will also have sensor means for measuring operational parameters of the turbine, including stack emissions and combustion dynamics from the turbine and control means for various operational elements of the turbine, including fuel distribution and/or fuel temperature and/or fuel blend ratio and/or fuel-to-air ratio. Optionally, the tuning controller 10, various sensor means and control means may either be connected directly or via a distributed control system (DCS). The control system may also be provided with means for setting operational priorities for turbine operation, selected from the group comprising optimum NOx emissions, optimum power output, optimum combustor dynamics, optimum fuel blend ratio, and/or optimum HRSG life, such as that shown in FIG. 3 discussed above. Using this tuning system, operational priorities are selected, operational parameters are sensed and tuning occurs using the methods discussed herein with respect to optimizing HRSG life and turbine operation, provided that in this instance, f/a ratio is the predetermined first operational control element to be adjusted to optimize HRSG life, while other operational control elements may be adjusted in order to keep the combustion turbine within the allowable limits for each operational parameter.

A method of optimizing the mechanical life of an HRSG through tuning the operation of a gas turbine, is now disclosed using the systems described herein. The method first includes establishing a communication link between the turbine controller 10 and (optionally) the DCS 20 and receiving data from the HRSG and/or gas turbine sensor means regarding the status of various operational parameters of the HRSG and the turbine. The operational parameter values are then compared to set of standard data to determine if adjustment to operational control elements is required in order to bring the operation of the turbine or HRSG into allowable limits. If tuning is needed, the tuning controller will communicate with the selected operational control elements to perform a defined incremental adjustment of the selected control element. The system then receives, at the tuning controller, via the sensor means and DCS operational parameter data regarding the operation of both the HRSG and the turbine from the sensor means and determines if the adjustment conforms turbine operation to a set standard or if a further incremental adjustment is desired.

The sensed data from the HRSG may include steam outlet temperatures and/or steam superheater intra-stage attemperator over-saturation conditions. The operational control element that is adjusted to modify the values of these sensed parameters may be the fuel-to-air ratio of the turbine. Once the HRSG values are within allowable limits, if further tuning is required to bring the operation of the turbine within its allowable limits. This will be done according to the tuning methods described above, preferably without further modification to the f/a ratio, such that the operational control elements of fuel gas temperature, fuel splits or fuel blend ratio.

The tuning of the system may be adapted for method for tuning a premixed combustion system wherein there exists two distinct modes of operation. The turbine being tuned (not shown) may have an outer ring of identical fuel nozzles utilizing an outer nozzle fuel split to modulate the circumferential fuel distribution within these outer nozzles, an inner fuel nozzle which utilizes an inner nozzle fuel split to adjust the fuel-to-air ratio of the inner to outer nozzles. The outer an inner nozzles discussed herein are known to those skilled in the art and not specifically recounted herein. The two distinct modes of operation comprise a "lean" inner nozzle mode whereby the f/a ratio of the inner nozzle is less than the f/a ratio of the outer fuel nozzles, and a "rich" inner nozzle whereby the f/a ratio of the inner nozzle is greater than the f/a ratio of the outer fuel nozzles. The method for tuning a system having these distinct modes comprises selecting, at the tuning controller 10 of a hybrid fuel split schedule for varying modes based on the turbine load. The "lean" center nozzle fuel split schedule will be at higher load conditions and the "rich" fuel split schedule will be used at lower load and turndown conditions, where the turbine is being operated at the lowest level possible in order to maintain operation of the HRS G.

The method may include the steps disclosed above along with making, at the tuning controller 10, a determination of whether the current mode of operation is utilizing either a "lean" or "rich" inner nozzle mode of operation, and selecting the direction of adjustment for Fuel Circuit Split 1 and/or Fuel Circuit Split 2 when a tuning issue exists, depending on which mode of operation is being utilized at the current operating conditions and preset operational parameters stored within the turbine controller.

All of the methods provided above can be conducted using Boolean-logic toggle switches, such as those shown in FIG. 3, to select user-desired optimization criteria. One of the optimization criteria is Optimum HRSG Life, whereby toggling of this switch to a "1" ("TRUE") allows the tuning controller to improve HRSG mechanical operating margins, such as steam outlet temperature and/or steam superheater intra-stage attemperator saturation temperature margin, through changes in the HRSG inlet conditions via modifications to the gas turbine fuel-to-air ratio. These changes may be made using the methods and systems disclosed above.

A method for tuning a premixed combustion system is also provided whereby there exists an outer ring of fuel nozzles utilizing an outer nozzle fuel split to modulate the circumferential fuel distribution within these outer nozzles, utilizing two modes of operation: a "lean minor circuit 1" subset of the outer nozzles whereby the f/a ratio of this outer fuel nozzle subset is less than the f/a ratio of the remaining outer fuel nozzles, and a "rich minor circuit 1" inner nozzle whereby the f/a ratio of this outer fuel nozzle subset is greater than the f/a ratio of the remaining outer fuel nozzles. The method includes usage of a hybrid fuel split schedule, with a "rich minor circuit 1" fuel split schedule at higher load conditions, and usage to a "lean minor circuit 1" fuel split schedule at lower load and turndown conditions. The method may also include varying other operational control elements, as described herein, in order to bring the operation of the turbine or HRSG into allowable limits.

The method may also include usage of a hybrid fuel split schedule, with a "lean minor circuit 1" fuel split schedule at higher load conditions, and usage to a "rich minor circuit 1" fuel split schedule at lower load and turndown conditions. Further, the method may include making a determination, at the tuning controller 10, if the current mode of operation is utilizing either a "lean minor circuit 1" or "rich minor circuit 1" mode of operation, and adjusting, using operational control elements for fuel splits, the Fuel Circuit Split 1 and/or Fuel Circuit Split 2 in the proper direction, when a tuning issue exists, depending on which mode of operation is being utilized at the current operating conditions.

A method is also provided for tuning a premixed combustion system, using similar systems and steps as described above, whereby there exists one or more annular rings of fuel nozzles (of same or different type, controlled by an circumferential fuel split affecting circumferential distribution of fuel within each fuel nozzle ring). In the current system, it is contemplated that a second family of fuel splits may be available (if more than one annular ring of fuel nozzles exists), which adjusts the relative (radial) amount of fuel to each of the radially concentric fuel nozzle rings (ring 1, ring 2, etc.), utilizing two modes of operation: a "lean minor circuit ring 1" subset of the ring 1 fuel nozzles whereby the f/a ratio of this ring 1 fuel nozzle subset is less than the f/a ratio of the remaining fuel nozzles of ring 1, and a "rich minor circuit ring 1" subset of the ring 1 fuel nozzles whereby the f/a ratio of this outer fuel nozzle subset is greater than the f/a ratio of the remaining fuel nozzles of ring 1. The tuning method comprises, use of a hybrid fuel split schedule, with a "lean minor circuit ring 1" fuel split schedule at higher load conditions, usage of a "rich minor circuit ring 1" fuel split schedule at lower load and turndown conditions, and similar usage of "rich" and "lean" fuel split schedules, one at high loads and the other at lower load/turndown conditions, for each of the remaining fuel nozzle rings of the combustion system. Each of the fuel schedules may be pre-programmed into the tuning controller 10 and selected based on sensed operational parameters of the system.

The method may also be modified, depending on operational priorities and user input to the tuning controller 10, to include usage of a hybrid fuel split schedule, with a "rich minor circuit ring 1" fuel split schedule at higher load conditions, usage to a "lean minor circuit ring 1" fuel split schedule at lower load and turndown conditions, and similar usage of "rich" and "lean" fuel split schedules, one at high loads and the other at lower load/turndown conditions, for each of the remaining fuel nozzle rings of the combustion system.

A method is also provided for tuning a premixed combustion system, such as that disclosed above, whereby there exists one or more annular rings of fuel nozzles (of same or different type, controlled by an circumferential fuel split affecting circumferential distribution of fuel within each fuel nozzle ring), whereby a second family of fuel splits may be available (if more than one annular ring of fuel nozzles exists) which adjusts the relative (radial) amount of fuel to each of the radially concentric fuel nozzle rings (ring 1, ring 2, etc.), utilizing two modes of operation: a "lean minor circuit ring 1" subset of the ring 1 fuel nozzles whereby the f/a ratio of this ring 1 fuel nozzle subset is less than the f/a ratio of the remaining fuel nozzles of ring 1, and a "rich minor circuit ring 1" subset of the ring 1 fuel nozzles whereby the f/a ratio of this outer fuel nozzle subset is greater than the f/a ratio of the remaining fuel nozzles of ring 1. The method first comprises the step of determining if the current mode of operation is utilizing either a "lean minor circuit ring 1" or "rich minor circuit ring 1" mode of operation, making a similar determination of the current mode of operation, either "rich" or "lean" minor fuel circuit operation, for each of the remaining fuel nozzle rings of the combustion system. Once these determinations are made, the method comprises the step of adjusting, via the tuning controller 10 and selected operational control element, Fuel Circuit Split 1 and/or Fuel Circuit Split 2 in the proper direction, when a tuning issue exists. The direction of adjustment is determined based on which mode of operation is being utilized at the current operating conditions.

Figure 9:
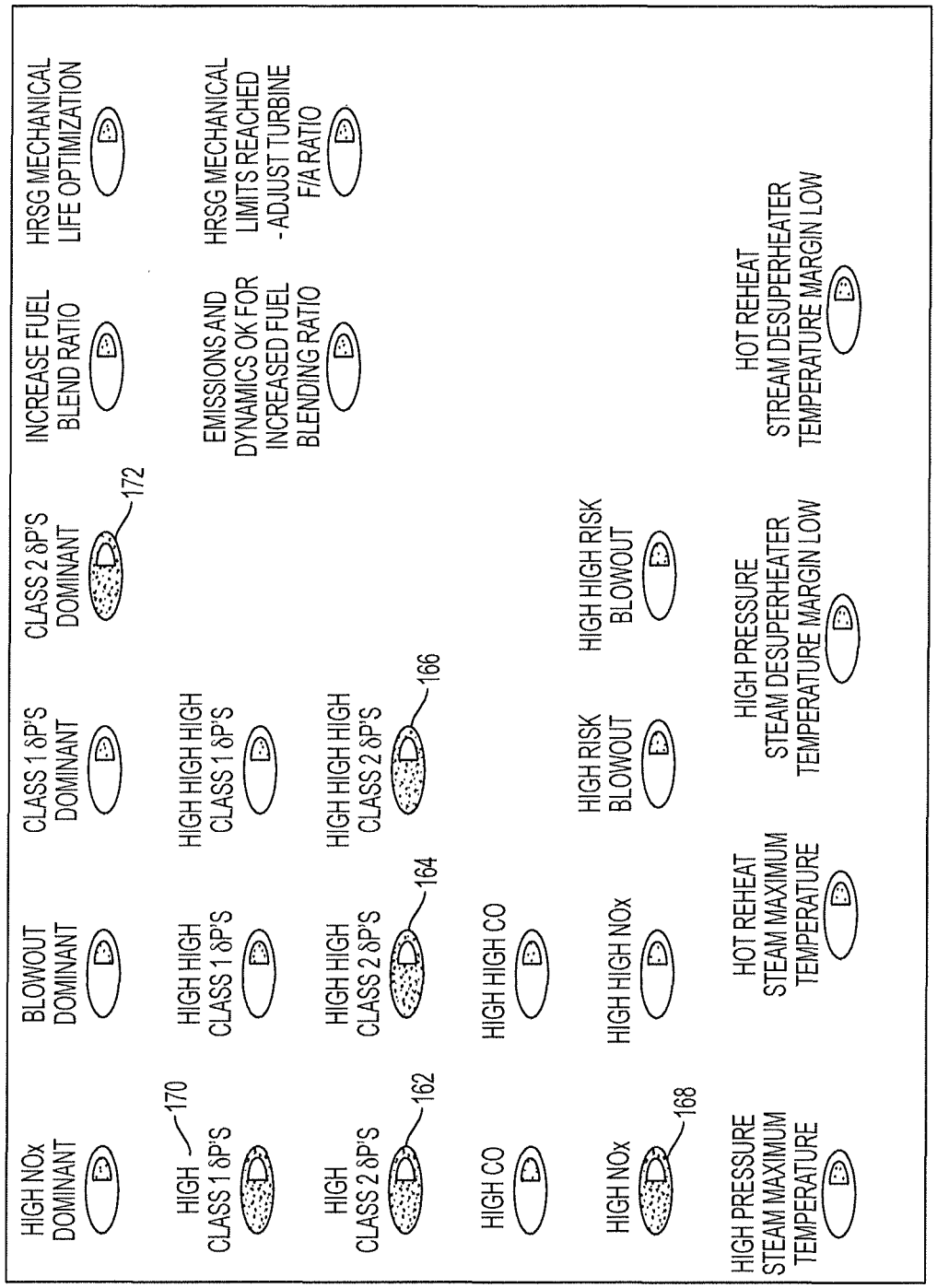
FIG. 9 shows a first example schematic of the determination of the system's dominant tuning concern, given various alarm inputs into the present disclosure.

FIGS. 9-12 provide exemplary visual representations of the autotuning system interface depicting how the Boolean Logic Hierarchy works in practice. FIG. 9 shows the alarms returned in connection with the example set forth above with respect to FIG. 8. Namely, alarms are returned for Class 2 δP's at the levels of H 162, HH 164 and HHH 166. In addition, alarms for NOx 168 and Class 1 δP's 170 are returned at the H level. Since more extreme levels trump conflicts of different alarms at the same level, the HHH Class 2 δP's is the priority and therefore the dominant tuning concern 172.

Figure 10:
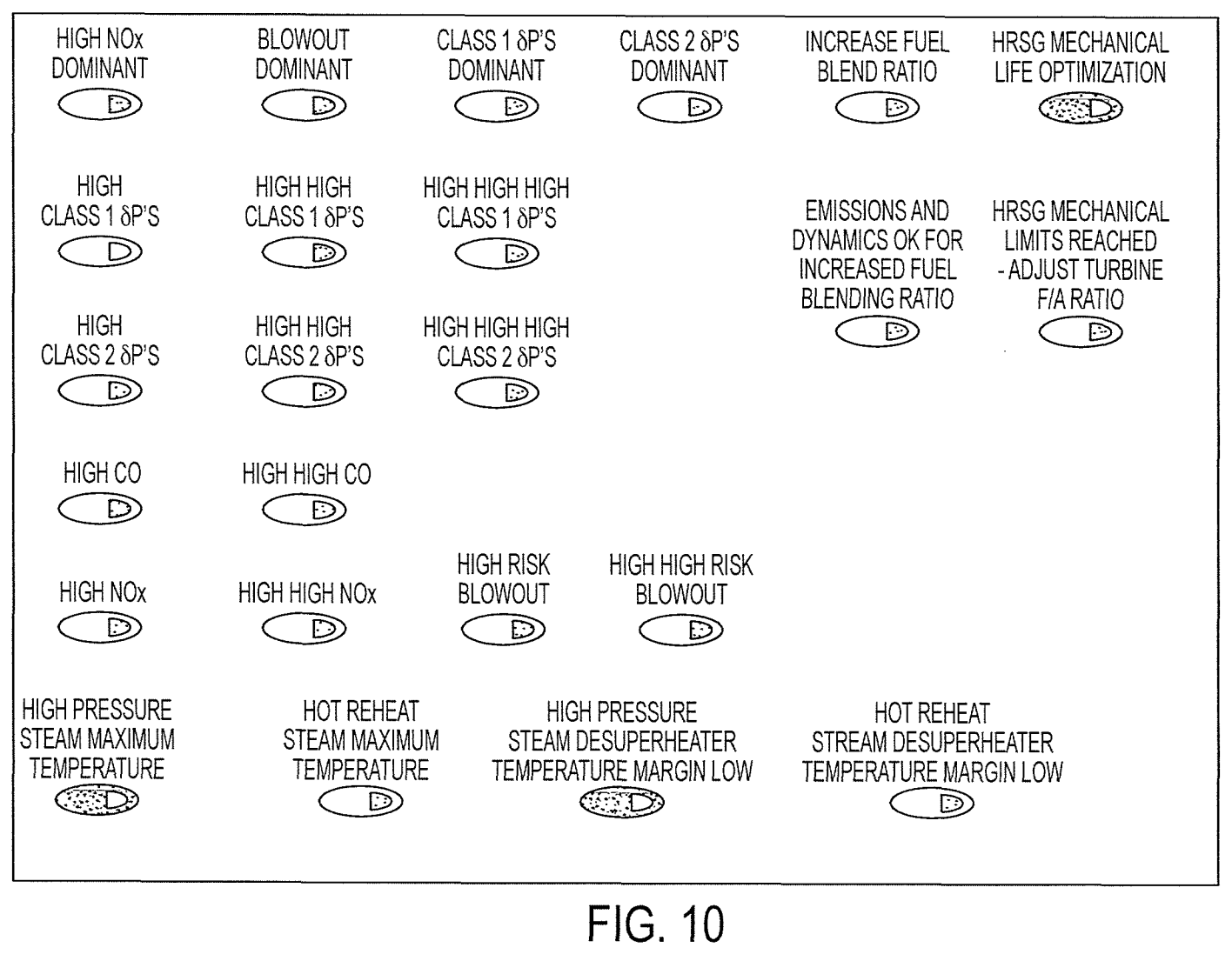
Figure 11:
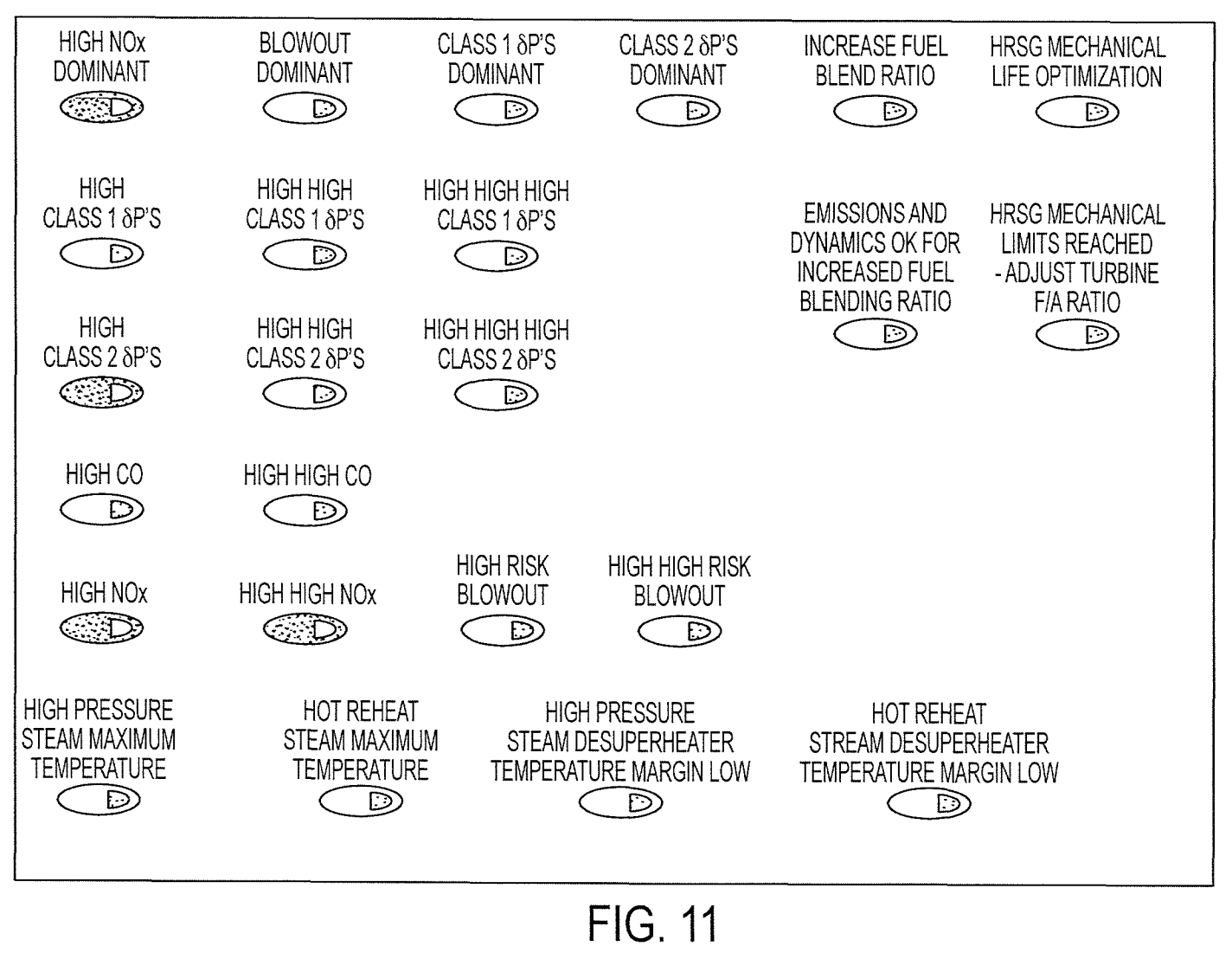
Figure 12:
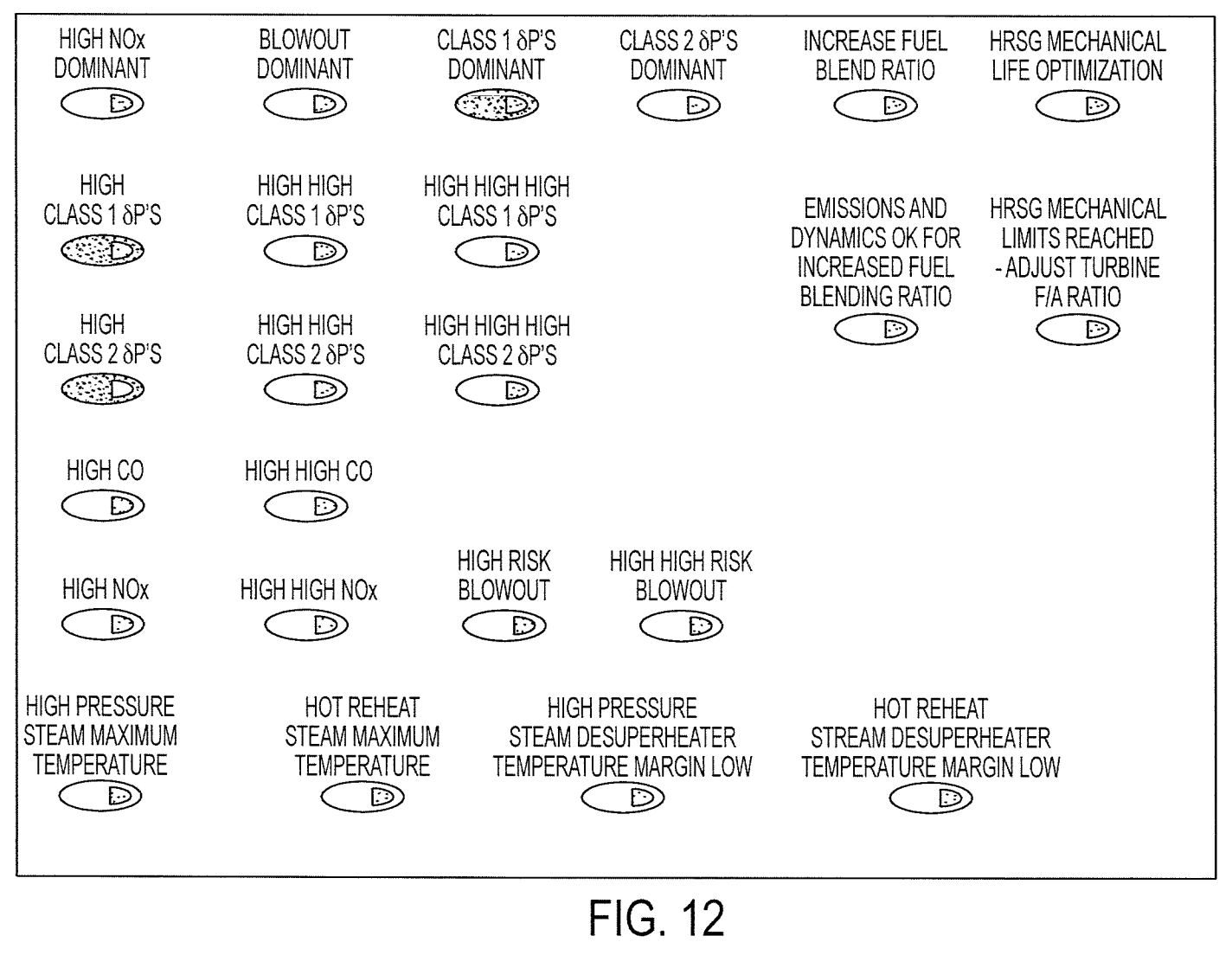

FIGS. 10-12 show various further examples of the dominant tuning concern for different "True" alarm levels under the user defined hierarchy 144 of FIG. 8. FIG. 10 shows high pressure steam at maximum operating temperature and the high pressure steam desuperheater at saturation conditions (placing water into the steam pipe), with no other alarms active. Thus, HRSG Mechanical Life Optimization is the dominant tuning concern. FIG. 11 shows a Class 2δP's at an H level, with NOx at both an H and HH condition, thus making High NOx as the dominant tuning concern. Finally, FIG. 12 shows both Class 1 δP's and Class 2 δP's at the H level. Referring to the user ranking of dominant tuning issues 144 in FIG. 8, Class 1 δP's is ranked as a priority above Class 2 δP's and thus, although the severity of the alarms is equal, Class 1 δP's becomes the dominant tuning concern.

Figure 13:
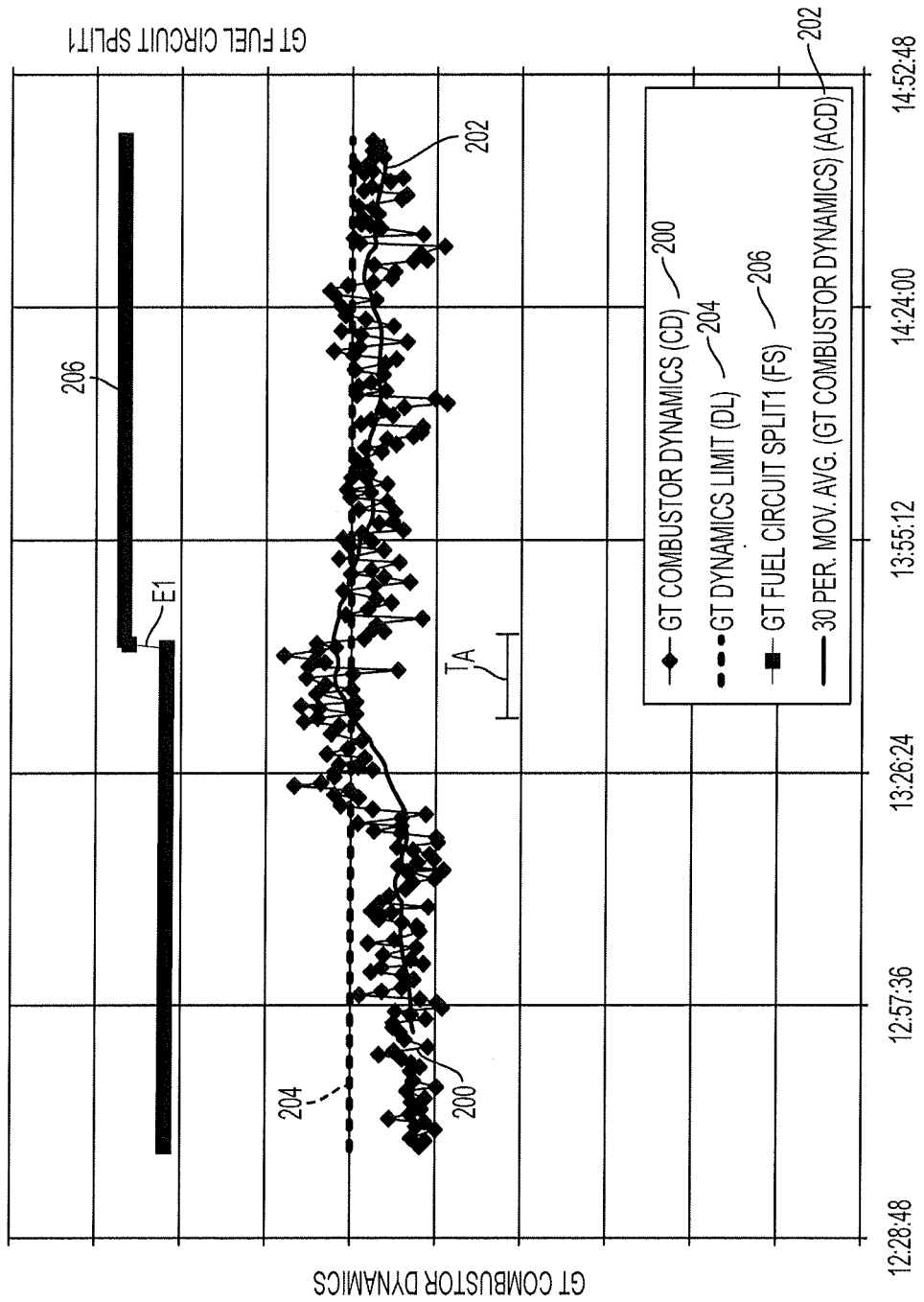
FIG. 13 shows a first operational example of operational tuning of a gas turbine engine system as contemplated by the present disclosure.

In FIGS. 13-16, there is shown various examples of the operational results of a tuning operation of a tuning controller of the present disclosure based on operational data from a running turbine system. In FIG. 13, the dominant tuning concern is high Class 2 δP's, and a change in the combustor fuel split E1 is made in reaction to a high Class 2 δP's alarm generated when the combustor dynamics moves outside of the set operational priorities for optimum dynamics. The actual combustor dynamics data received by the turbine controller 10 from, for example, the CDMS 50 is designated as 200 in the graph. The moving average for the combustor dynamics is identified in the graph as 202. When the combustor dynamics exceed the dynamics alarm limit value 204 for a set period of time TA an alarm goes off within the tuning controller. This alarm causes the first event E1 and a resulting incremental adjustment in the combustor fuel split tuning parameter 206. As illustrated, the incremental increase in the fuel split causes a corresponding drop in the combustor dynamics 200, with the average combustor dynamics 202 dropping below the dynamics alarm limit 204. As time continues, the tuning is held by the tuning controller and the average combustor dynamics 202 maintains its operational position below the dynamics limit 204. Thus, no further adjustments necessary or alarms issued.

Figure 14:
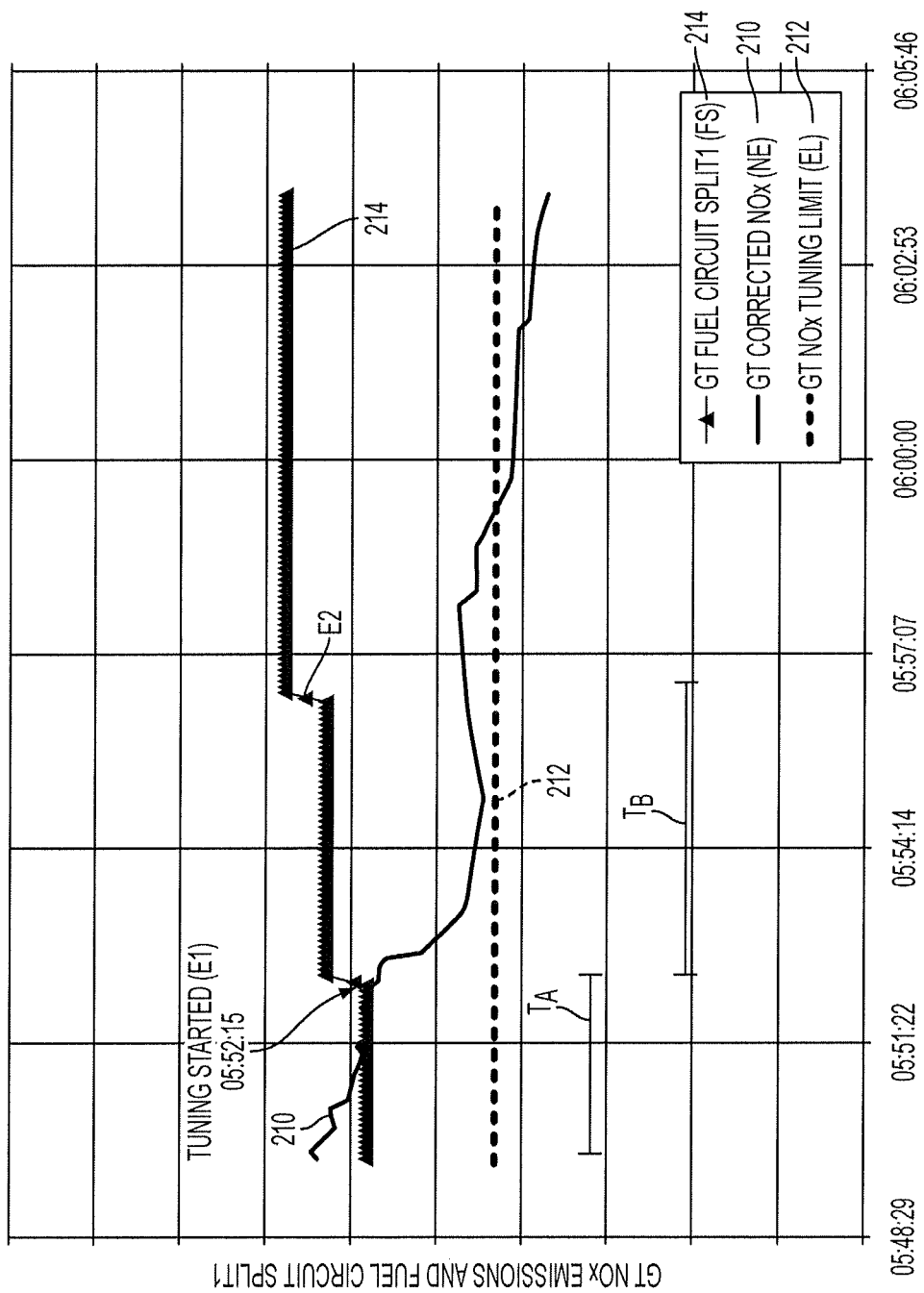
FIG. 14 shows a second operational example of operational tuning of a gas turbine engine system as contemplated by the present disclosure.

In FIG. 14, the tuning criteria is High NOx emissions. As NOx emissions data 210 is received from the tuning controller, an alarm is generated after the passage of time TA. The alarm is caused by the NOx emissions 210 exceeding the operational standard or tuning limit 212. The alarm activates a first event E1 resulting in an incremental increase in the fuel split 214. After a period of time TB from the first event E1, the NOx alarm is still activated due to the NOx emissions 210 exceeding the preset tuning limit 212. This continued alarm after time TB causes a second event E2 and a second incremental increase in the fuel split value 214. This second increase is equal in magnitude to the first incremental increase. The second event E2 causes the NOx emissions level 210 to drop below the preset limit 212 within the review time period and halts the alarm. As the NOx emissions 210 remains below the limit 212, the fuel split 214 tuning is held and the operation of the turbine continues with the defined operational parameters.

Figure 15:
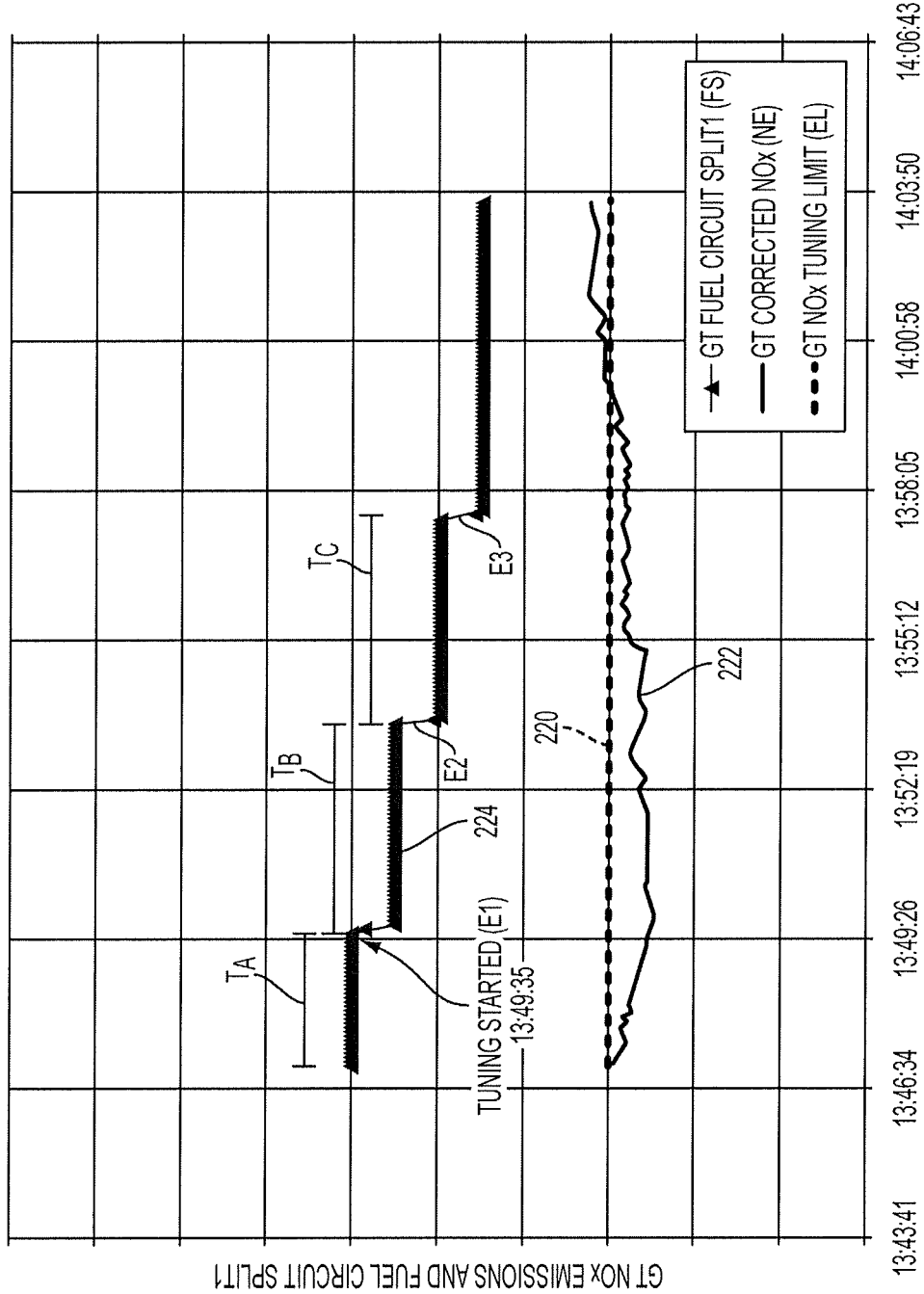
FIG. 15 shows a third operational example of operational tuning of a gas turbine engine system as contemplated by the present disclosure.

In FIG. 15, the tuning criteria is Blowout, with the alarm created by a low NOx reading received by tuning controller. As shown, the NOx tuning limit 220 is defined. Upon passage of the set time period TA from receiving NOx level data 222, the alarm is generated and a first event E1 occurs. At the first event E1, the fuel split level 224 is incrementally adjusted downward. After a set passage of time TB from event E1 additional NOx emissions data 222 is received and compared to the preset alarm level 220. Because the NOx is still below the alarm level 220, a second event E2 occurs resulting in a further incremental reduction in the fuel split value 224. A further passage of time TC from event E2 occurs and additional data is received. Again, the NOx data 222 is low, maintaining the alarm and resulting in a further event E3. At event E3, the fuel split value 224 is again reduced by the same incremental amount. This third incremental adjustment results in the NOx emissions 222 rising above the preset limit 220 and results in removal of the alarm. The fuel split 224 tuning value set after event E3 is held in place by the tuning controller 10.

Figure 16:
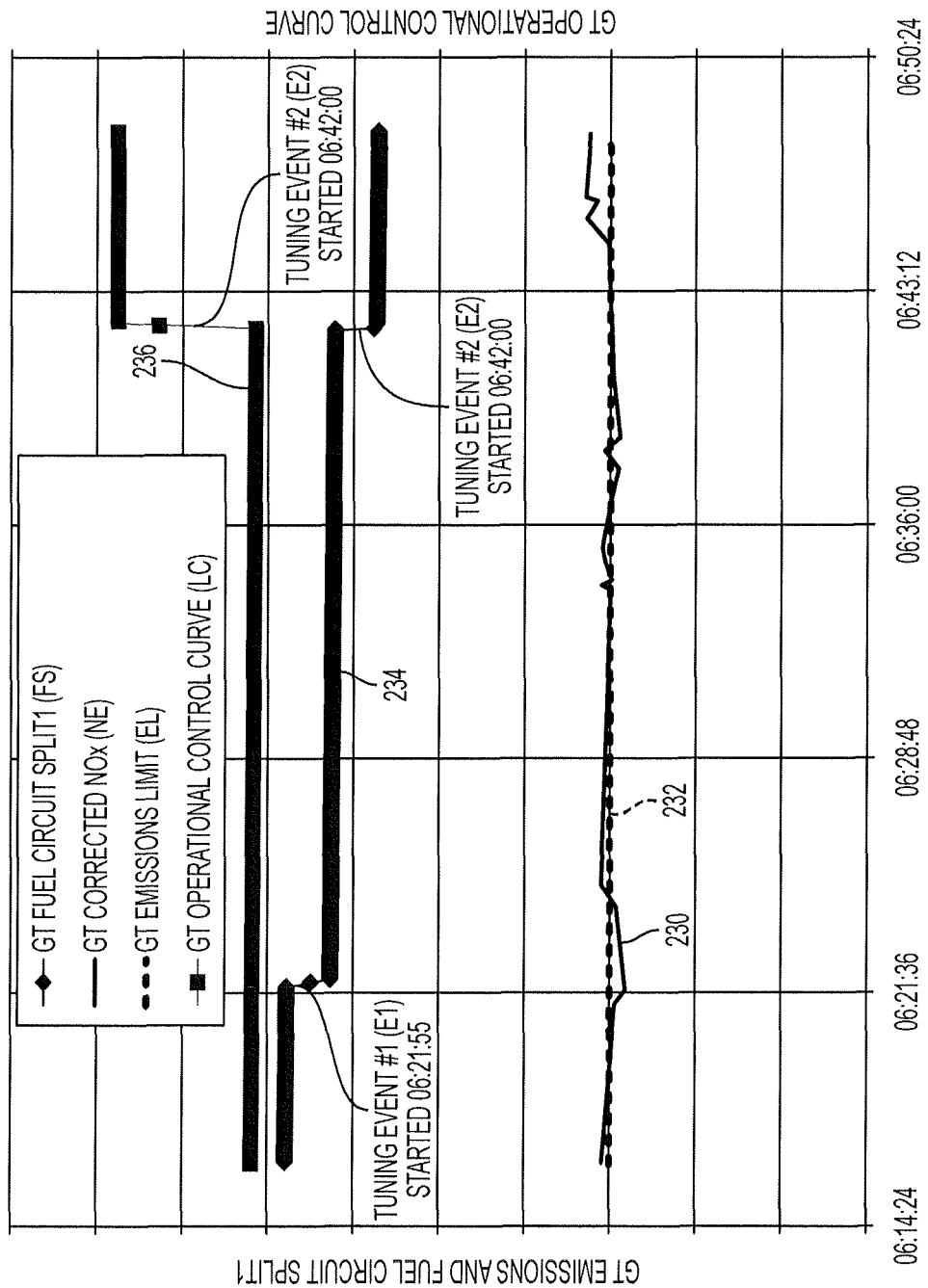
FIG. 16 shows a fourth operational example of operational tuning of a gas turbine engine system as contemplated by the present disclosure.

In FIG. 16, the tuning criteria is again Blowout, whereby the NOx emissions data 230 received by the tuning controller 10 is again tracking along the lower emissions limit 232. At the first tuning event E1, the fuel split value 234 is incrementally dropped to result in a corresponding increase in the NOx emissions 230 over the lower limit 232. After this first incremental adjustment, the NOx emissions for a period of time holds above the limit 232 and then begins to again fall. At the second tuning event E2, the fuel split value 234 is again adjusted by the designated fixed incremental value. This second adjustment then places the fuel split value 234 at its defined minimum within the preset range of allowable values (determined as a hard coded limit within the tuning controller 10). Because this limit is reached, the tuning operation moves to the next operational parameter, which is normally the second fuel circuit adjustment. In the example provided, this second circuit value (not shown) is already at its set maximum/minimum and is therefore not adjusted. Thus, the tuning operation moves on to the next operational parameter, load control curves 236. As shown, at event E2 an incremental adjustment is made in the load control curve value 236. The increase in the load control curve value 236 results in a corresponding increase in the NOx emission 230 to a value above the minimum 232 and removes the alarm. Upon removal of the alarm, the tuning settings are held and no further adjustments are made. The tuning controller 10 then proceeds to receive data from the sensor means, through the DCS, and continues to make comparisons with the set operational standards (including the minimum NOx emissions limit EL).

The present invention has been described and illustrated with respect to a number of exemplary embodiments thereof. It should be understood by those skilled in the art from the foregoing that various other changes, omissions and additions may be made therein, without departing from the spirit and scope of the present invention, with the scope of the present invention being described by the foregoing claims.

What is claimed is:

1. A tuning system for optimizing the mechanical life of a heat recovery steam generator, the heat recovery steam generator being operated in connection with a combustion turbine, the tuning system comprising:
 a turbine controller;
 sensor means for sensing the operational parameters of a turbine and heat recovery steam generator; and
 control means for controlling various operational control elements,
 wherein the turbine controller is adapted to tune the operation of the gas turbine in accordance with the following steps:
  selecting operational priorities for at least one of the heat recovery steam generator or turbine operation, whereby each selected operational priority will determine operational standards for the heat recovery steam generator and turbine,
  receiving operational parameter data for the operation of the turbine and the heat recovery steam generator from the sensor means,
  comparing the operational data to stored operational standards based on the selected operational priorities to determine if both heat recovery steam generator and turbine operation conform to the operational standards,
  determining the dominant tuning criteria for non-conforming operation of the heat recovery steam generator and turbine, based on the preset operational priorities,
  communicating with the control means to perform a selected adjustment in a first operational control element of the gas turbine,
  receiving operational data from the sensor means upon passage of a set period of time to determine if an additional incremental change is desired, and making further adjustments to the selected first operational control element,
  selecting a further operational parameter adjustment, different than the first selected operational control element, and
  receiving operational data from the sensor means upon passage of a set period of time to determine if an additional incremental change is desired.

2. The system of claim 1, further comprising a distributed control system, whereby the tuning controller communicates with the sensor means and the control means using the distributed control system.

3. The system of claim 1, wherein the operational priorities are selected from the group comprising optimum NOx emissions, optimum power output, optimum combustor dynamics, optimum heat recovery steam generator life, and optimum fuel blend ratio.

4. The system of claim 3, wherein the optimum fuel blend ratio comprises the ratio of non-pipeline quality gas to pipeline quality gas.

5. The system of claim 1, wherein, the selected operational control element adjustment based on the dominant tuning criteria, the selected adjustment having a fixed incremental value and defined range, each incremental change input over a set period of time sufficient for the turbine to gain operational stability.

6. The system of claim 1, wherein the adjustments in the operational control elements of the gas turbine are selected from the group comprising combustor fuel distribution split within the nozzles of the combustor, fuel gas inlet temperature, fuel/air ratio within the turbine, and gas fuel blend ratio (fuel composition).

7. The system of claim 1, wherein the operational priorities comprise optimum heat recovery steam generator life, and wherein adjustment to the fuel-to-air ratio of the turbine is selected as the first operational control element to be adjusted when the selected operational priority is optimum heat recovery steam generator life.

8. The system of claim 1, wherein the tuning controller is adapted to optimizing the mechanical life of the heat recovery steam generator by first adjusting the fuel-to-air ratio operational control element prior to making any tuning adjustments based on remaining operational priorities.

9. The system of claim 8, wherein, after adjustment of the fuel-to-air ratio operational control element, the turbine controller subsequently tunes additional control elements in response to changes in operational parameters of the turbine occurring as the result of adjustment of the fuel-to-air ratio operational control element.

10. The system of claim 1, wherein the heat recovery steam generator has operational parameters are selected from the group consisting of high pressure outlet steam temperatures, hot reheat steam temperatures, high pressure intra-stage desuperheater outlet temperatures and pressures, and hot reheat intra-stage desuperheater outlet temperatures and pressures.

11. The system of claim 1, wherein the turbine has operational parameters selected from the group consisting of turbine stack emissions and combustion dynamics.

12. A method of optimizing the mechanical life of a heat recovery steam generator through tuning the operation of a gas turbine, the method comprising:
providing sensor means for sensing the operational parameters of the heat recovery steam generator;
providing control means for controlling operational control elements of the turbine, wherein the control means adjust selected control elements in response to control signals from the tuning controller;
providing a tuning controller for receiving data regarding the operational parameters from the sensor means and sending control signals to the control means;
establishing a communication link between the tuning controller, the control means and the sensor means;
sensing data regarding operational parameters of the heat recovery steam generator and the turbine and transmitting the sensed data to the turbine controller;
receiving the sensed operational parameter data at the turbine controller and comparing the sensed operational parameter data to stored operational data stored in the turbine controller to determine if adjustment to an operational control element is necessary to improve operating parameters of the turbine or heat recovery steam generator, wherein the preset operational parameter levels are based on operational priorities of the turbine;
communicating, from the turbine controller to the control means, control signals perform a defined incremental adjustment of a first selected operational control element,
after a preset period of time from the adjustment of the first selected operational control element, sensing data regarding operational parameters and transmitting the sensed data to the turbine controller and comparing the sensed operational data to the preset operational parameter levels determine if further adjustments within the operational control means are required,
determining if the first operational control element is able to receive further adjustments and communicating, from the turbine controller to the control means, control signals perform a defined incremental adjustment of a second selected operational control element.

13. The method of claim 12, further comprising the step of selecting operational priorities of the turbine and heat recovery steam generator.

14. The method of claim 12, wherein the first selected control element to be adjusted is the fuel-to-air ratio of the turbine, wherein the adjustment to the fuel-to-air ratio is done in response to operational parameters of the heat recovery steam generator being out of allowable limits when compared to the stored operational data.

15. A method for tuning a premixed combustion system of a combustion turbine, the turbine comprising at least one combustor having an outer ring of identical fuel nozzles and an inner fuel nozzle which utilizes an inner nozzle fuel split to adjust the fuel-to-air ratio of the inner to outer nozzles, the method comprising:
providing a turbine controller programmed to operate the premixed combustion system according to at least two distinct modes of operation, the distinct modes comprising a lean inner nozzle mode whereby the fuel-to-air ratio of the inner nozzle is less than the fuel-to-air ratio of the outer fuel nozzles, and a rich inner nozzle mode whereby the fuel-to-air ratio of the inner nozzle is greater than the fuel-to-air ratio of the outer fuel nozzles,
sensing the operating conditions of the turbine, wherein the sensed conditions include high load, low load and turndown; and
operating the premixed combustion system using both the lean inner nozzle mode and the rich inner nozzle mode according to the operating condition of the turbine; wherein modifying the operational mode of the turbine from lean inner nozzle mode to rich inner nozzle mode is done by adjusting the fuel splits of the turbine.

16. The method of claim 15, wherein the premixed combustion system is operated at a lean inner nozzle mode during high load conditions and the premixed combustion system is operated at rich inner nozzle mode during low load and turndown conditions.

17. The method of claim 15, wherein the premixed combustion system is operated at a rich inner nozzle mode during high load conditions and the premixed combustion system is operated at lean inner nozzle mode during low load and turndown conditions.

* * * * *